United States Patent
Bowman

(10) Patent No.: US 12,304,286 B2
(45) Date of Patent: May 20, 2025

(54) REMOVABLE VEHICULAR WINDOW PANEL WITH INTEGRATED LATCHING ELEMENT AND CARRYING HANDLE

(71) Applicant: Magna Exteriors, Inc., Troy, MI (US)

(72) Inventor: Kyle S. Bowman, Holland, MI (US)

(73) Assignee: Magna Exteriors, Inc., Troy, MI (US)

( * ) Notice: Subject to any disclaimer, the term of this patent is extended or adjusted under 35 U.S.C. 154(b) by 0 days.

(21) Appl. No.: 18/477,812

(22) Filed: Sep. 29, 2023

(65) Prior Publication Data

US 2024/0110414 A1 Apr. 4, 2024

Related U.S. Application Data

(60) Provisional application No. 63/378,254, filed on Oct. 4, 2022.

(51) Int. Cl.
*B60J 1/08* (2006.01)
*B60J 1/00* (2006.01)
*B60J 5/04* (2006.01)

(52) U.S. Cl.
CPC .............. *B60J 1/085* (2013.01); *B60J 1/006* (2013.01); *B60J 5/0487* (2013.01)

(58) Field of Classification Search
CPC ...... B60J 5/0487; B60J 5/0476; B60J 5/0406; B60J 5/0408; B60J 5/0416; B60J 1/08; B60J 1/085; B60J 1/006; B60J 5/0463; E05C 3/044
See application file for complete search history.

(56) References Cited

U.S. PATENT DOCUMENTS

| | | | | |
|---|---|---|---|---|
| 2,567,153 A * | 9/1951 | Jackson | ..................... | B60J 1/14 49/463 |
| 4,121,870 A * | 10/1978 | Oakey | ........................ | B60J 7/11 296/218 |
| 4,127,302 A * | 11/1978 | Green | ........................ | B60J 7/11 52/656.1 |
| 4,302,045 A * | 11/1981 | McAdams, Sr. | ........... | B60J 7/11 70/211 |
| 4,644,699 A * | 2/1987 | Chandler | ............... | B60J 5/0487 49/501 |
| 5,551,197 A | 9/1996 | Repp et al. | | |
| 5,594,193 A * | 1/1997 | Sheridan | ................. | F41H 5/013 109/49.5 |
| 5,791,727 A * | 8/1998 | Doescher | ................... | B60J 1/14 296/146.16 |

(Continued)

*Primary Examiner* — Justin B Rephann
(74) *Attorney, Agent, or Firm* — HONIGMAN LLP

(57) ABSTRACT

A vehicular glass window panel assembly includes a glass panel having an inner side and an outer side, and a handle and catch element adhesively bonded along a first perimeter region of the inner side. The handle and catch element includes a handle portion and a catch configured for engaging a latching element of a vehicle when the window panel assembly is mounted at the vehicle to close over an aperture of the vehicle. The handle and catch element is formed as a single component via a plastic injection molding process. With the latching element engaged with the catch, the window panel assembly is secured at the vehicle. With the latching element disengaged from the catch, the window panel assembly is removable from the vehicle. With the window panel assembly removed from the vehicle, the handle portion is graspable by a user to carry the window panel assembly.

19 Claims, 28 Drawing Sheets

(56) References Cited

U.S. PATENT DOCUMENTS

| | | | |
|---|---|---|---|
| 5,799,444 A | 9/1998 | Freimark et al. | |
| 5,853,895 A | 12/1998 | Lewno | |
| 5,996,284 A | 12/1999 | Freimark et al. | |
| 6,026,611 A | 2/2000 | Ralston et al. | |
| 6,036,255 A * | 3/2000 | Lester | B60J 5/0487 |
| | | | 49/502 |
| 6,036,256 A * | 3/2000 | Hilliard | B60J 1/08 |
| | | | 160/369 |
| 6,691,464 B2 | 2/2004 | Nestell et al. | |
| 6,886,881 B1 * | 5/2005 | Henderson | B60J 5/0476 |
| | | | 49/502 |
| 7,003,916 B2 | 2/2006 | Nestell et al. | |
| 7,073,293 B2 | 7/2006 | Galer | |
| 7,634,873 B2 * | 12/2009 | Ruppert | B60J 5/0481 |
| | | | 49/502 |
| 8,066,319 B2 * | 11/2011 | Hafften | E05B 83/01 |
| | | | 296/146.1 |
| 8,333,036 B2 * | 12/2012 | Helms | E05B 77/44 |
| | | | 49/141 |
| 8,402,695 B2 | 3/2013 | Smith et al. | |
| 8,881,458 B2 | 11/2014 | Snider et al. | |
| 8,915,018 B2 | 12/2014 | Snider | |
| 10,363,798 B2 * | 7/2019 | Kleinhoffer | B60J 5/0468 |
| 10,562,380 B2 * | 2/2020 | Marchetti | B60J 5/0425 |
| 2003/0213179 A1 | 11/2003 | Galer | |
| 2004/0020131 A1 | 2/2004 | Galer et al. | |
| 2004/0021343 A1 * | 2/2004 | Dobbs | B60J 5/0408 |
| | | | 296/201 |
| 2006/0107600 A1 | 5/2006 | Nestell et al. | |
| 2008/0106124 A1 | 5/2008 | Snider | |
| 2008/0127563 A1 | 6/2008 | Tooker | |
| 2011/0084521 A1 * | 4/2011 | Shellenberger | B60J 1/06 |
| | | | 296/193.08 |
| 2012/0139293 A1 * | 6/2012 | Antonich | E05B 17/2023 |
| | | | 89/937 |
| 2014/0047772 A1 | 2/2014 | Hulst | |
| 2016/0023543 A1 * | 1/2016 | Rutland | B60J 5/0487 |
| | | | 49/463 |
| 2019/0092146 A1 * | 3/2019 | Nania | B60J 5/0408 |
| 2023/0070479 A1 | 3/2023 | Snider et al. | |

* cited by examiner

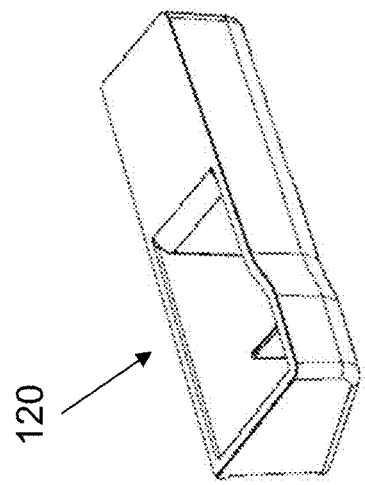
FIG. 14
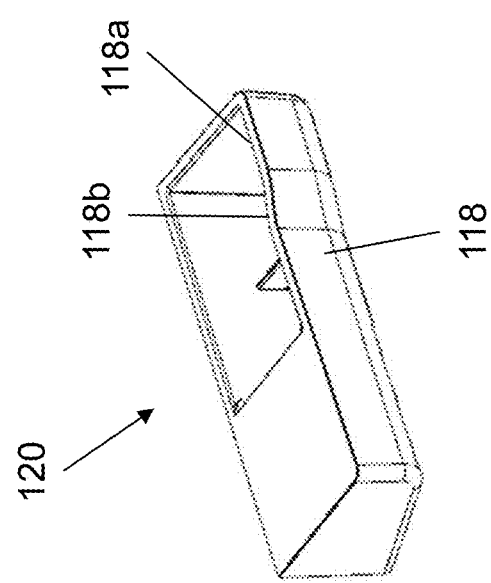

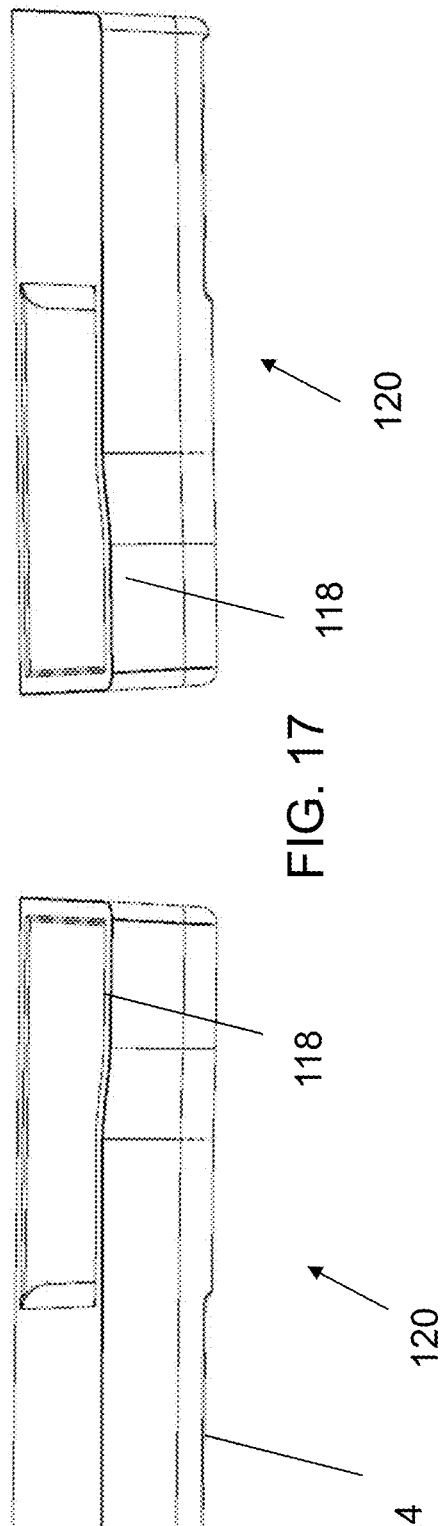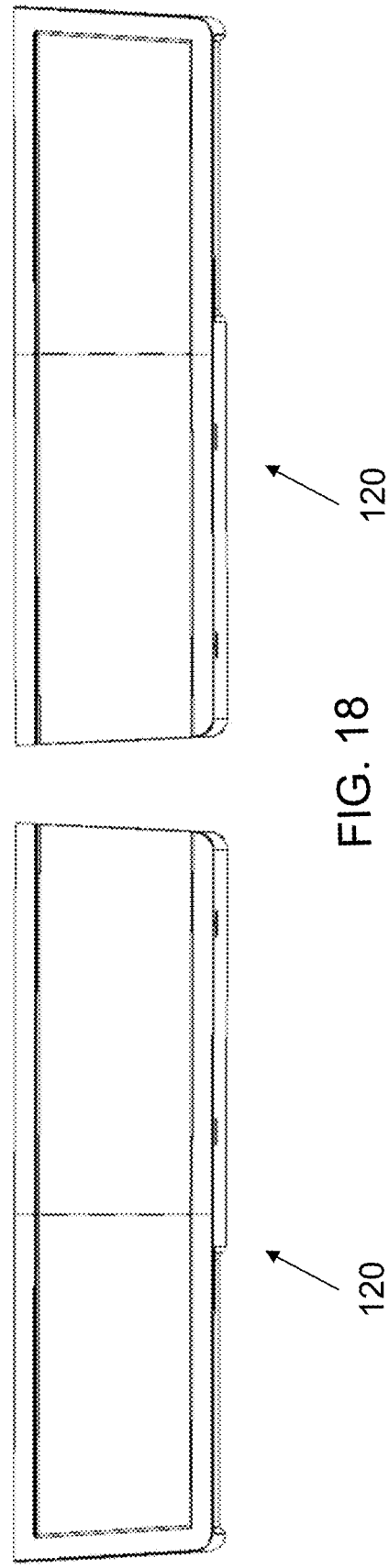

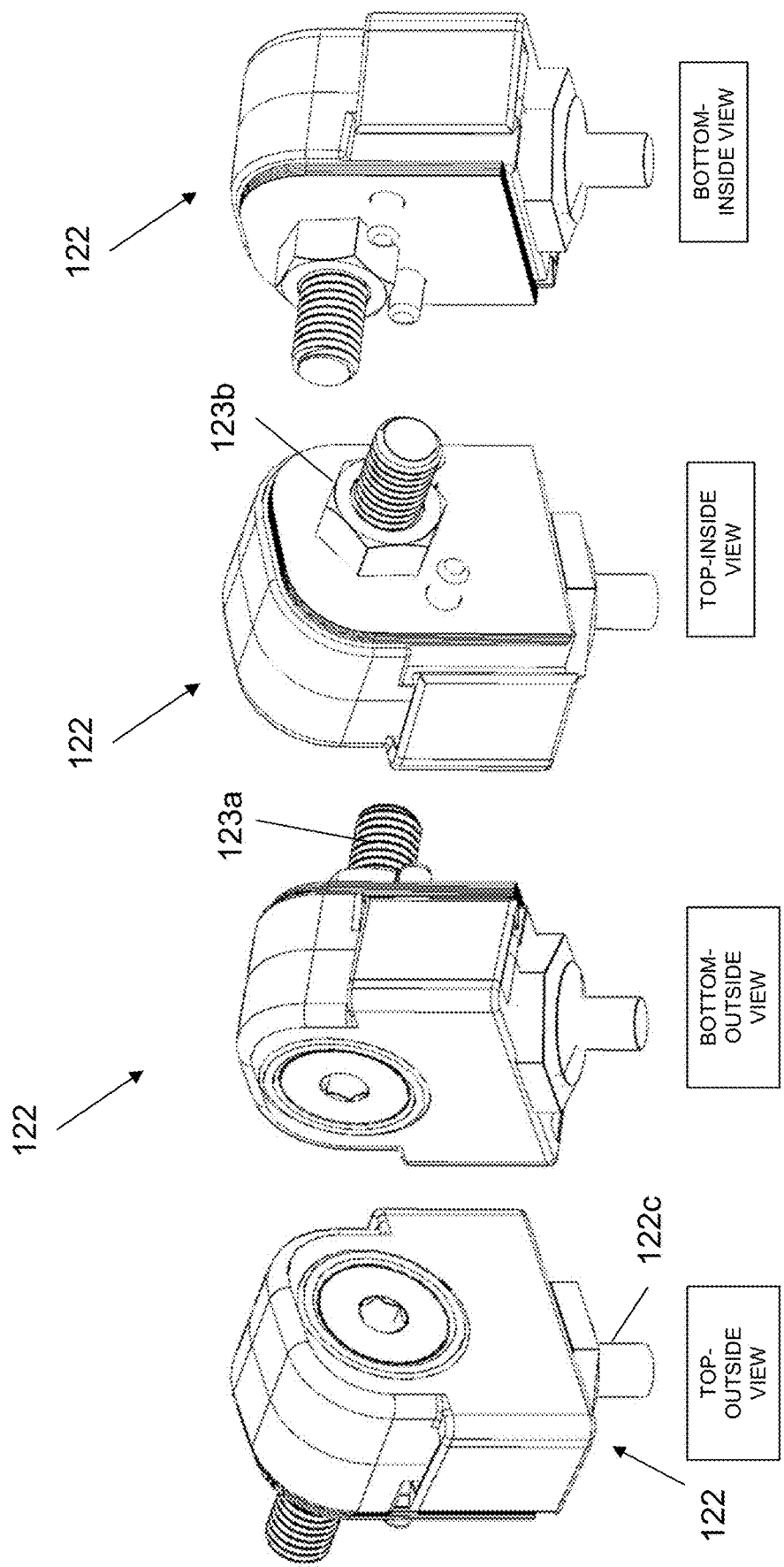

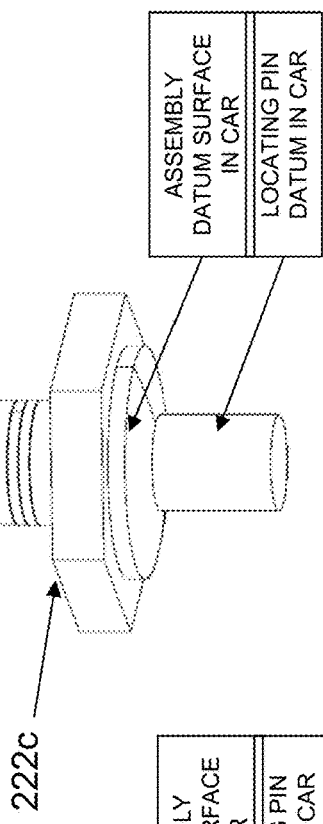
FIG. 27A
FIG. 27B
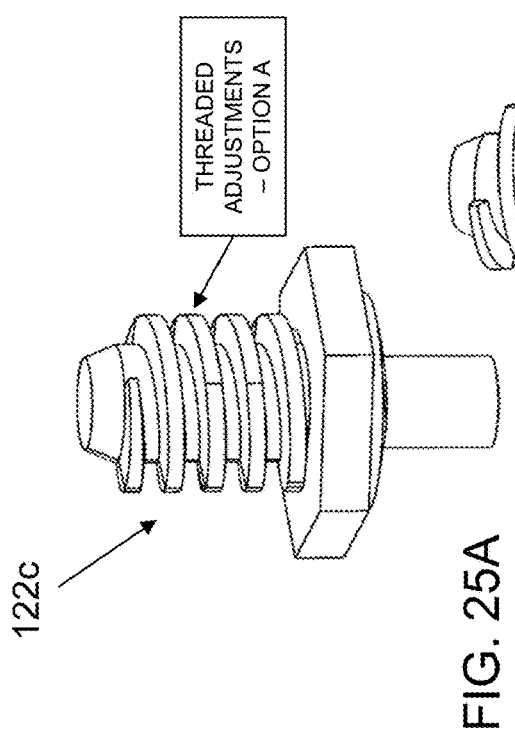
FIG. 25A
FIG. 25B

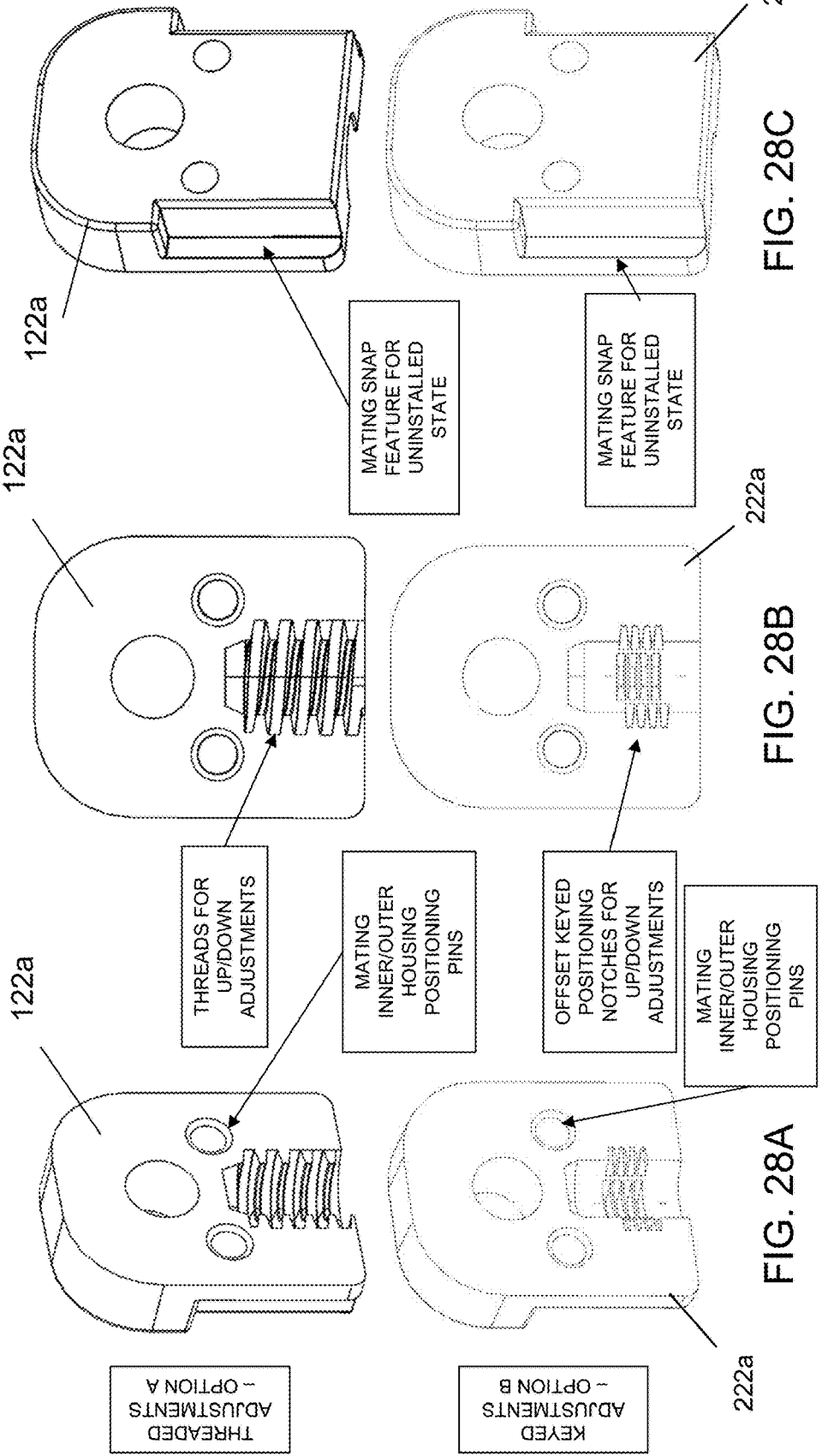

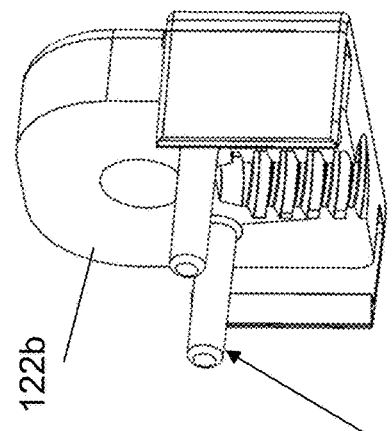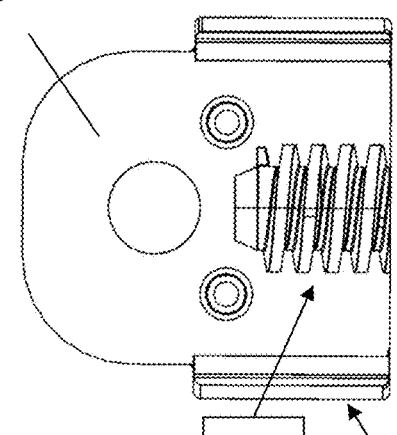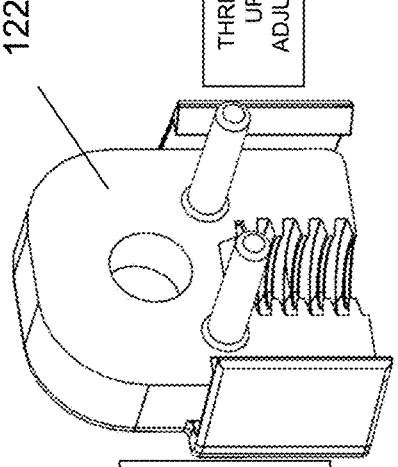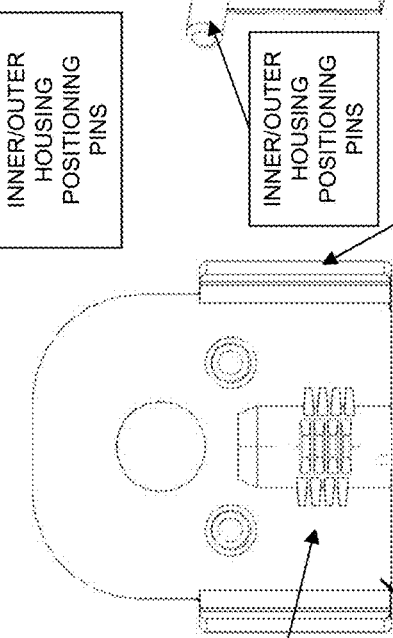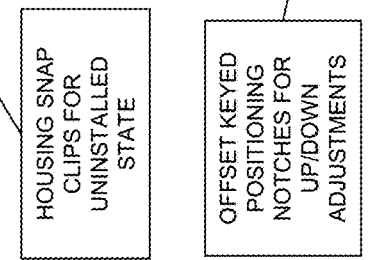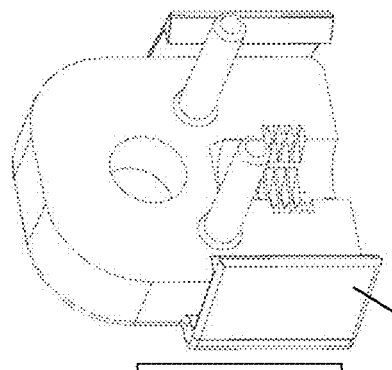

REMOVABLE VEHICULAR WINDOW PANEL WITH INTEGRATED LATCHING ELEMENT AND CARRYING HANDLE

CROSS REFERENCE TO RELATED APPLICATION

The present application claims the filing benefits of U.S. provisional application Ser. No. 63/378,254, filed Oct. 4, 2022, which is hereby incorporated herein by reference in its entirety.

FIELD OF THE INVENTION

The present invention relates to openable/closable window panel assemblies for vehicles.

BACKGROUND OF THE INVENTION

It is known to provide a removable and/or openable/closable window panel assembly at a vehicle. The panels are attached via latches to the vehicle and can be removed.

SUMMARY OF THE INVENTION

The present invention provides a removable glass window panel assembly for a vehicle, such as at a side or rear of the vehicle. The glass window panel assembly includes a glass panel having a pair of catches or catch portions that are configured to engage respective latches of the vehicle to secure the window assembly at the vehicle when the window assembly is disposed at an opening of the vehicle and the latches are moved to engage the catches. The glass window panel assembly includes a handle portion disposed between and integrated with the catch portions so that the window assembly may be readily carried by a user when the window assembly is removed from the vehicle. The integrated handle portion and catch portions are part of a single plastic injection molded (or otherwise formed) structure that is adhesively bonded at an inner side or surface of the glass panel.

These and other objects, advantages, purposes and features of the present invention will become apparent upon review of the following specification in conjunction with the drawings.

BRIEF DESCRIPTION OF THE DRAWINGS

FIG. 14 is an inner upper perspective view of the individual catch and handle portions of the vehicular glass window assembly of FIG. 11;

FIG. 17 is an inner side view of the individual catch and handle portions of FIG. 14;

FIG. 18 is an outer side view of the individual catch and handle portions of FIG. 14;

FIGS. 20-23 are perspective views of an adjustable locator of the window assembly;

FIGS. 25A and 25B are perspective views of a threaded adjustable pin of the adjustable locator;

FIGS. 26A-F are views of threaded housing portions for the threaded adjustable pin of the adjustable locator;

FIGS. 27A and 27B are perspective views of a keyed adjustable pin of the adjustable locator;

FIGS. 28A-F are views of a keyed housing for the keyed adjustable pin of the adjustable locator;

DESCRIPTION OF THE PREFERRED EMBODIMENTS

Figure 1:
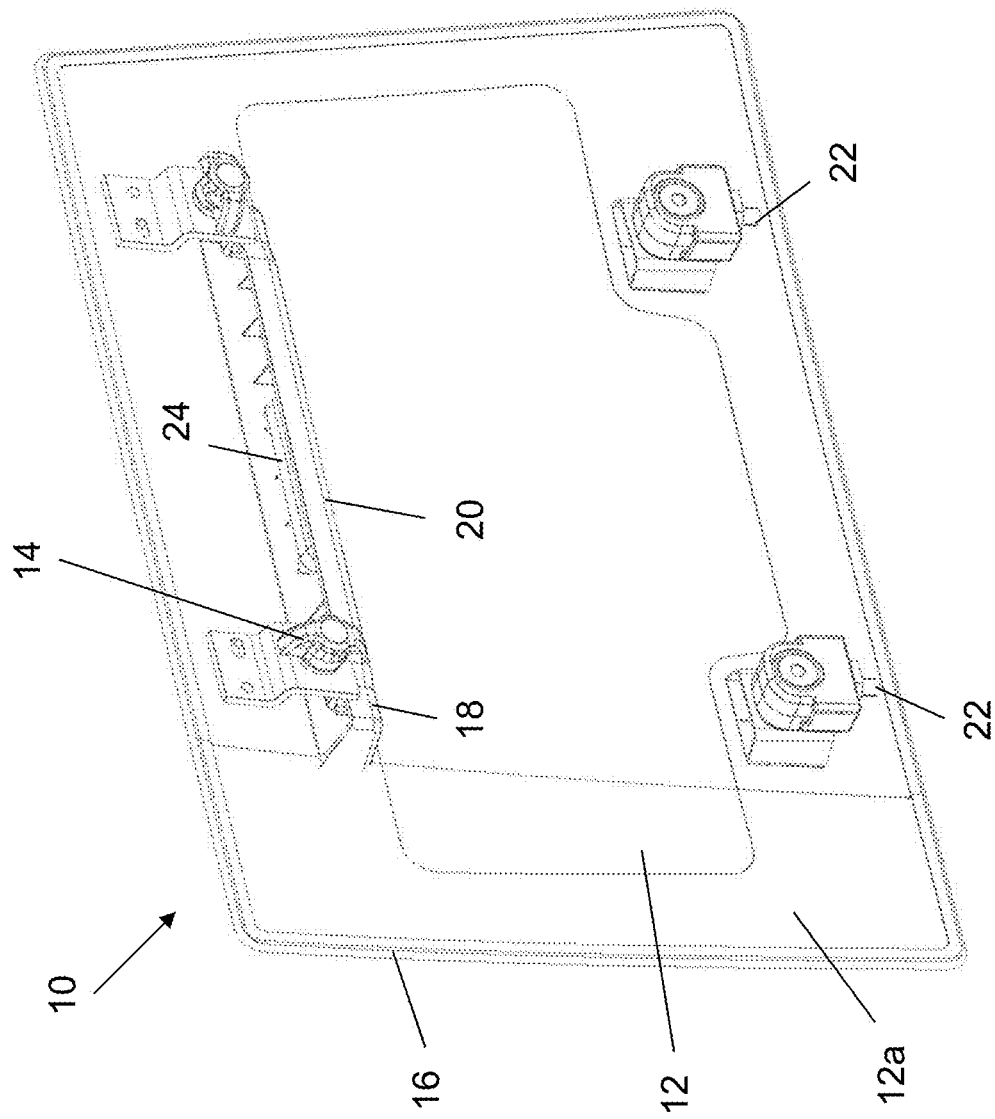
FIG. 1 is an inner upper perspective view of a vehicular glass window assembly, showing the vehicle-based latching elements engaging the catch portions of the window assembly to retain the window assembly at a vehicle.

Some vehicles have removable window panels to allow a user to remove the panels to provide a partially open side or rear or top. The window assembly may be attached at the vehicle via one or more pins at one perimeter region or edge region or end (e.g., a lower end) of the window panel and one or more latching elements at an opposite perimeter region or edge region or end (e.g., an upper end) of the window panel. When the latching elements at the vehicle are latched to or engaged with one or more respective catches of the window panel, the window assembly is held in place at the vehicle, and when the latching elements are unlatched or disengaged from the catches of the window panel, the window assembly can be removed from the vehicle.

Referring now to the drawings and the illustrative embodiments depicted therein, a glass window panel assembly 10 (FIGS. 1-3) includes a glass panel 12 that is attachable or mountable at a side or rear portion of a vehicle via a plurality of latches or latching elements 14. The latches 14 are attached at a frame portion or sheet metal portion of the vehicle that circumscribes or forms the opening that the window panel is positioned at when mounted at the vehicle. The window panel 10 has a perimeter seal or sealing element 16 disposed about its periphery to seal against the vehicle when the window is mounted at the vehicle. The latches 14 pivot or move to engage a respective catch portion 18 of a handle and catch construction or structure or element 20 that is bonded or adhesively attached at the inner side of the glass panel 12. The window assembly includes a pair of mounting pins or locator pins 22 that are configured to be received in respective receivers or receiving elements at the vehicle, whereby the window panel is positioned at the opening of the vehicle and the catches 18 can be positioned at the latches 14, such that the latches can be moved or pivoted to engage the catches to secure the window panel at the aperture of the vehicle. The catches 18 are part of or integrated with a handle 24 of the handle and catch structure 20 of the window assembly so that, when the latches are disengaged and the window assembly is removed from the vehicle, the window assembly may be readily carried and stored via a user holding the window assembly via the handle 24.

In the illustrated embodiment, the locator pins 22 of the window panel are adhesively bonded at a lower region or end of the window panel and spaced from the inner side or surface of the window panel 12. For example, the locator pins 22 may be adhesively attached at respective spacers or protrusions disposed at the inner surface of the window panel 12. Thus, when the window panel is disposed at the vehicle opening, the pins 22 are positioned to be received in the receiving elements of the vehicle that are spaced from the inner surface of the window panel 12. With the pins 22 received at the receiving elements of the vehicle, the window panel is pivoted or moved into a closed position over the opening to position the catches 18 at an inner portion of the vehicle, with the latches positioned in their disengaged orientation. When the window is pivoted to the closed position, the latches 14 are pivoted or moved to engage the catches 18 to secure the window panel at the vehicle opening.

In other words, with the locator pins 22 along the lower edge region of the window panel 12 received at the receiving elements of the vehicle, the catches 18 along an upper edge region or end of the window panel 12 are positioned at or near or aligned with respective latches 14 of the vehicle. With the catches 18 aligned with the latches 14, the latches 14 may be moved or pivoted into engagement with the catches 18 to secure the window panel at the vehicle. The latches 14 are movable or pivotable relative to the window panel and vehicle between a first or engaged position, where the latches 14 are moved or pivoted into engagement with the catches 18 and secure the window panel at the vehicle, and a second or disengaged position, where the latches 14 are moved or pivoted away from the catches 18 to release the window panel and allow the window panel to be removed from the vehicle.

Figure 8:
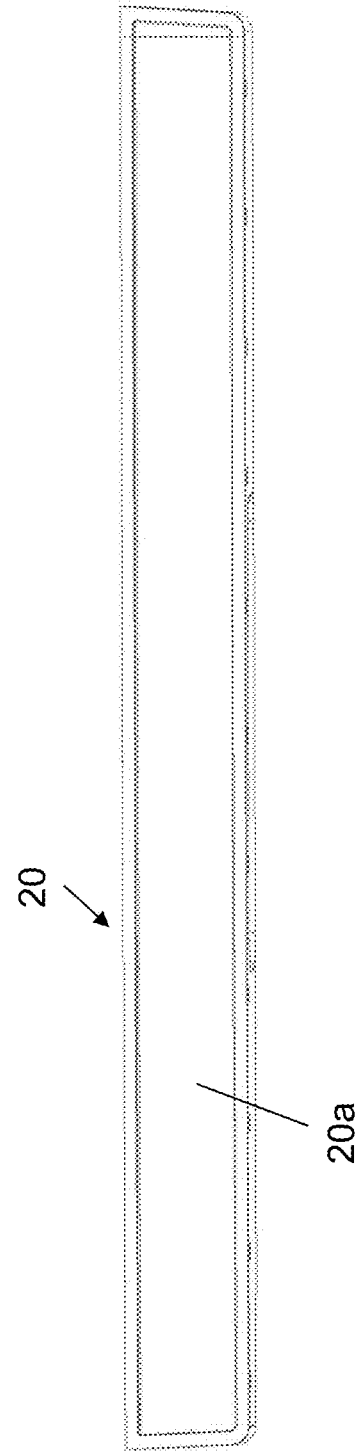
FIG. 8 is an outer side view of the catch portions and handle portion of FIG. 4.
Figure 9:
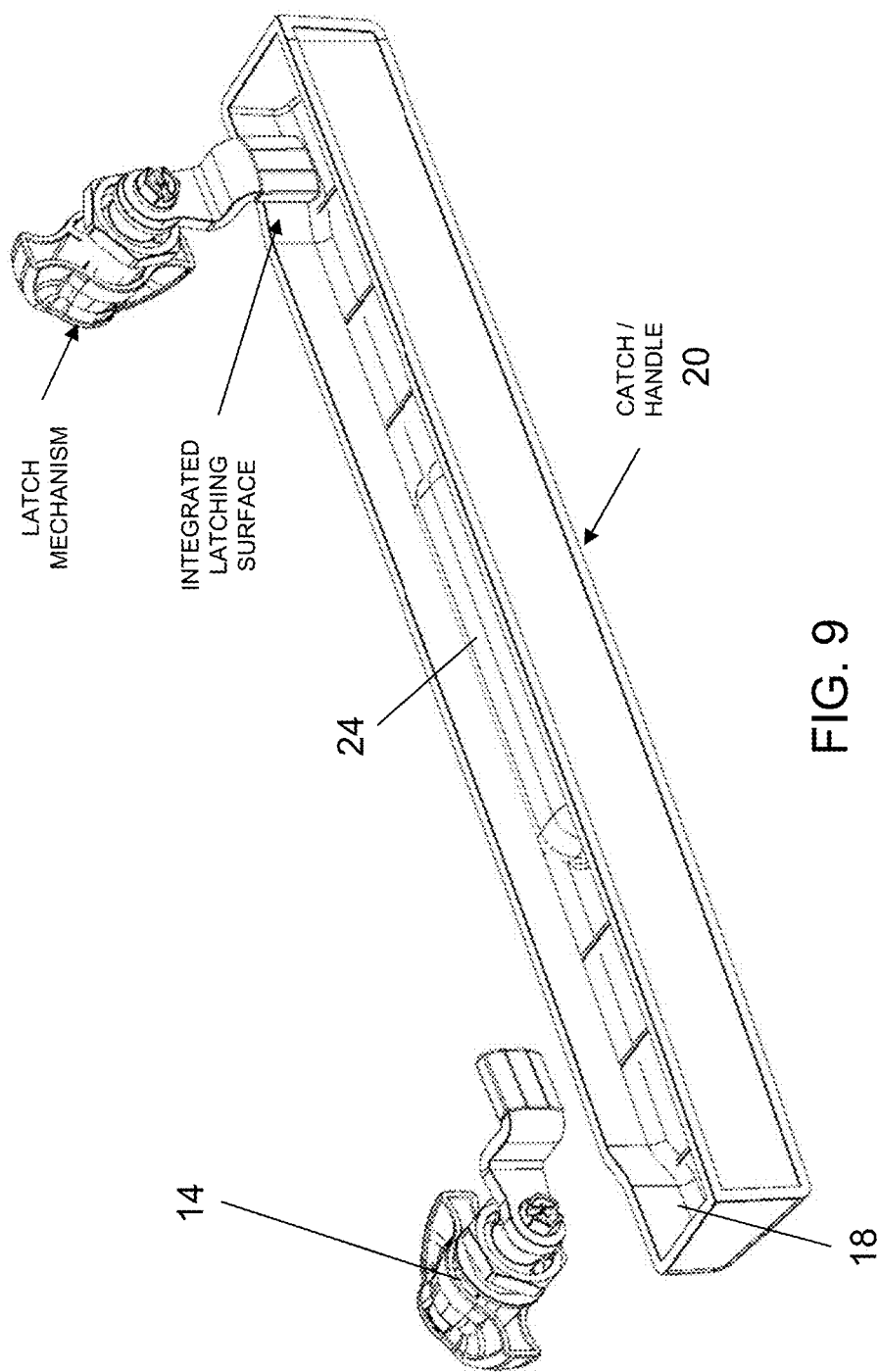
FIG. 9 is a perspective view of the catch and handle and latch mechanisms.

The handle and catch structure or element 20 includes a plastic or polymeric element (such as formed via a plastic injection molding process) that is adhesively bonded at the inner side of the glass window panel 12. As shown in FIGS. 8 and 9, the structure is formed with a recess along the window panel attaching surface 20a that receives the bonding adhesive and sets the bondline thickness of the adhesive to a desired or appropriate dimension.

Figure 4:
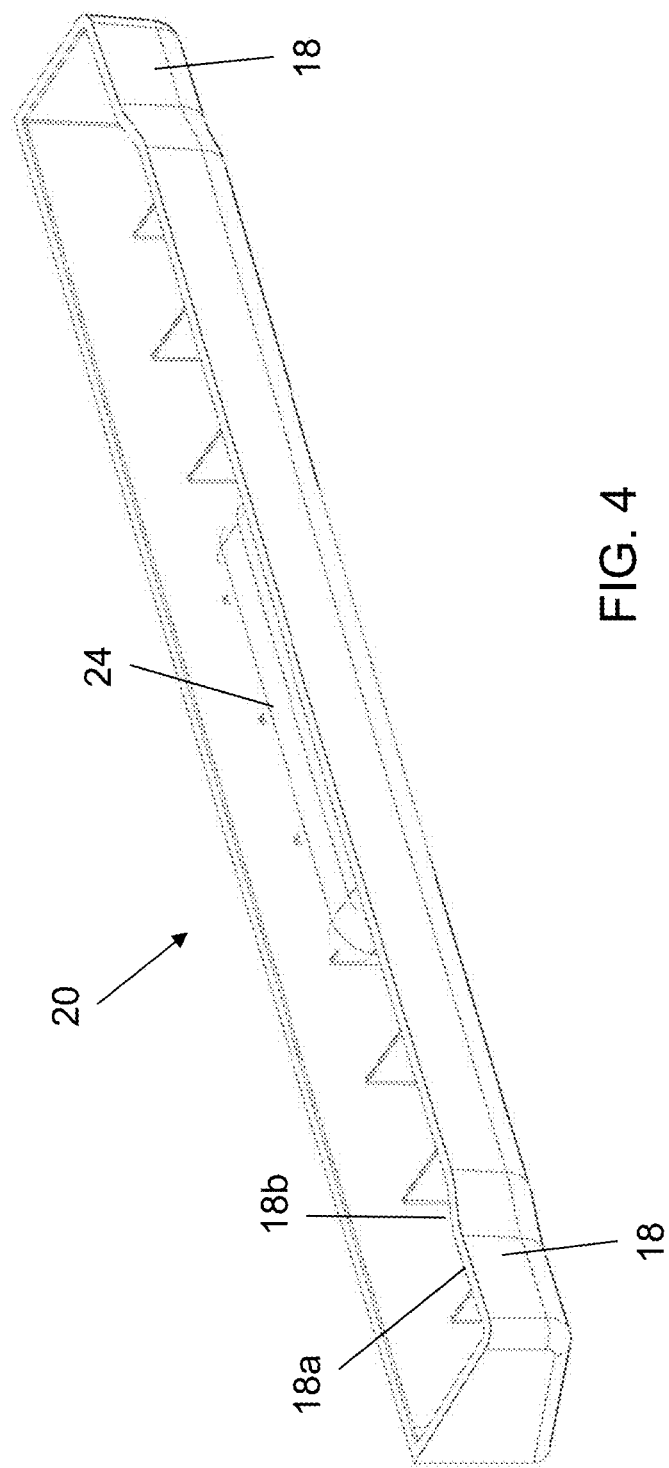
FIG. 4 is an inner upper perspective view of the catch portions and handle portion of the vehicular glass window assembly of FIG. 1.
Figure 5:
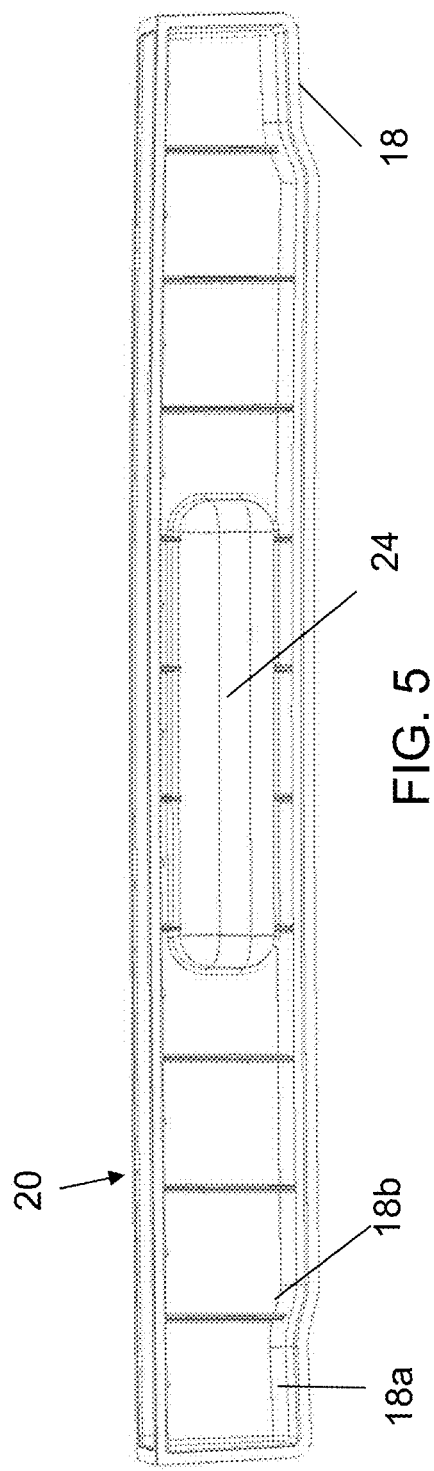
FIG. 5 is a top view of the catch portions and handle portion of FIG. 4.
Figure 6:
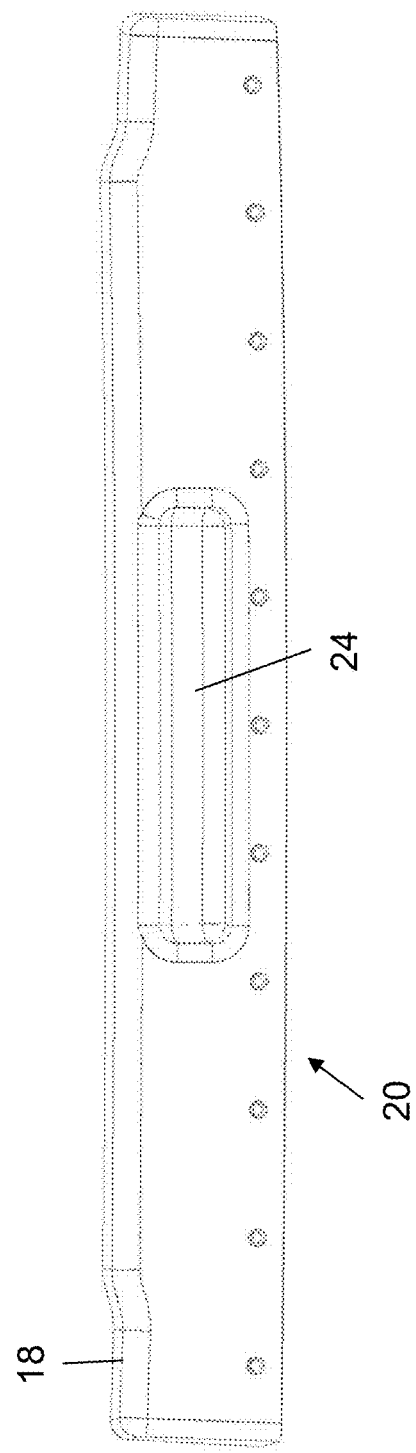
FIG. 6 is a bottom view of the catch portions and handle portion of FIG. 4.
Figure 7:
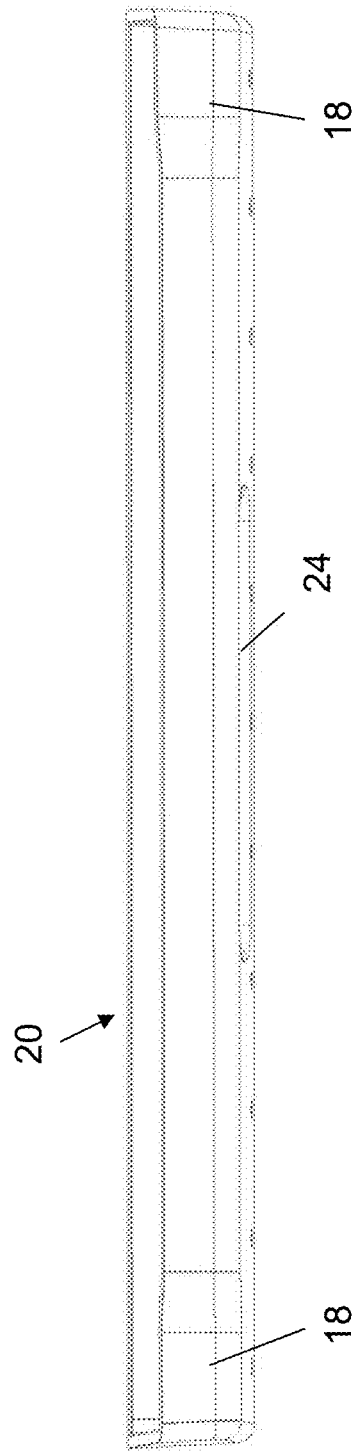
FIG. 7 is an inner side view of the catch portions and handle portion of FIG. 4.

The handle and catch structure 20 is formed with the handle or pocket portion 24 at a central region and the two catches or catch portions 18 at opposite ends of the structure. The catches 18 are formed as inner flat sections or surfaces 18a at the end of the structure with inward ramped surfaces 18b so that, when the latches 14 are pivoted to latch the window assembly at the vehicle, the latching elements 14 engage the respective ramped surfaces 18b to draw the window panel tight against the vehicle and then the latching elements 14 engage the flat surfaces 18a of the catches 18 to preclude outward movement of the window panel relative to the vehicle (FIGS. 4, 5, and 9).

In other words, the handle and catch structure 20 may include a recess or cavity having an upward facing opening so that, when the latches 14 are pivoted into engagement with the catches 18, the latches 14 pivot downward into the recess and engage an inner surface of a sidewall of the handle and catch structure 20 to pull the window panel toward the surface of the vehicle at the opening and the latches 14. The recess of the handle and catch structure 20 receives the latches 14 as the latches 14 pivot from the disengaged position toward the engaged position and the latches 14 are guided along the ramped surfaces 18b to the flat surfaces 18a to urge the window panel toward the latches 14 in the engaged position.

The handle portion 24 provides a grasping portion of the structure to assist the user in pivoting the window panel to the closed position, whereby the user can hold the handle portion with one hand while pivoting the latching elements to the engaged orientation with the other hand. The handle portion 24 is formed as a rounded recess at the central region of the handle and catch structure 20 to accommodate a user's fingers so that a user can readily grasp the handle portion 24 and pivot the window panel or to carry the window assembly when the window assembly is detached from the vehicle. The central portion of the handle and catch structure 20 at or near the handle portion 24 has a greater cross dimension or width than the catches, such that the ramped surface 18b provides the ramped or curved transition between the central portion and the respective flat surface 18a of the catch 18.

Figure 10:
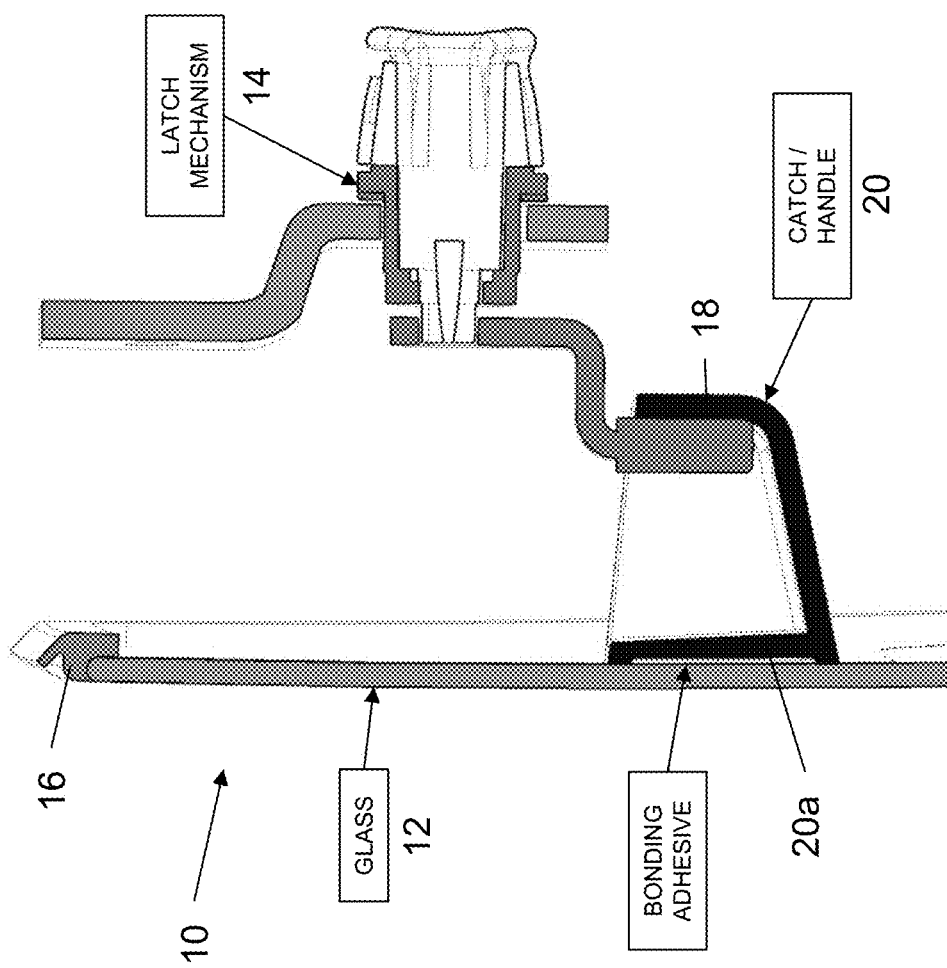
FIG. 10 is a sectional view of the window assembly showing the latching elements engaging the catch portions of the window assembly to retain the window assembly at the vehicle.
Figure 11:
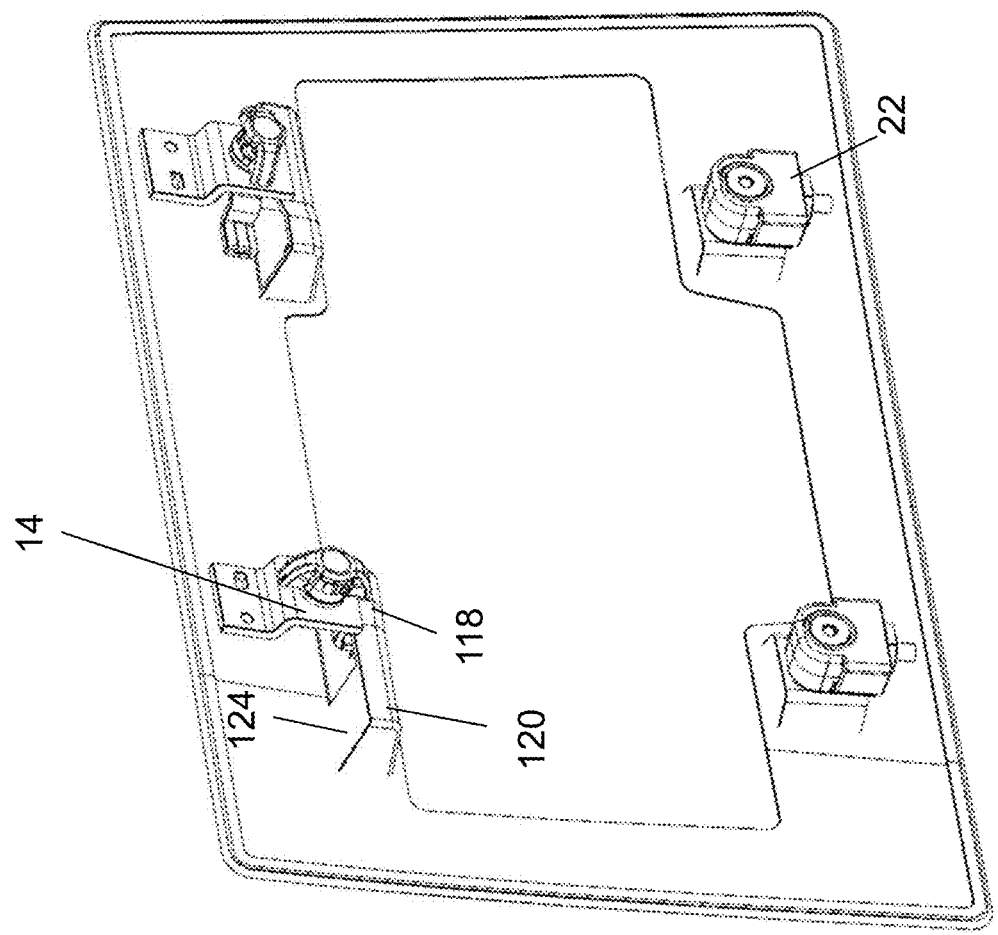
FIG. 11 is an inner upper perspective view of a vehicular glass window assembly, showing the vehicle-based latching elements engaging the individual catch and handle portions of the window assembly to retain the window assembly at the vehicle.
Figure 12:
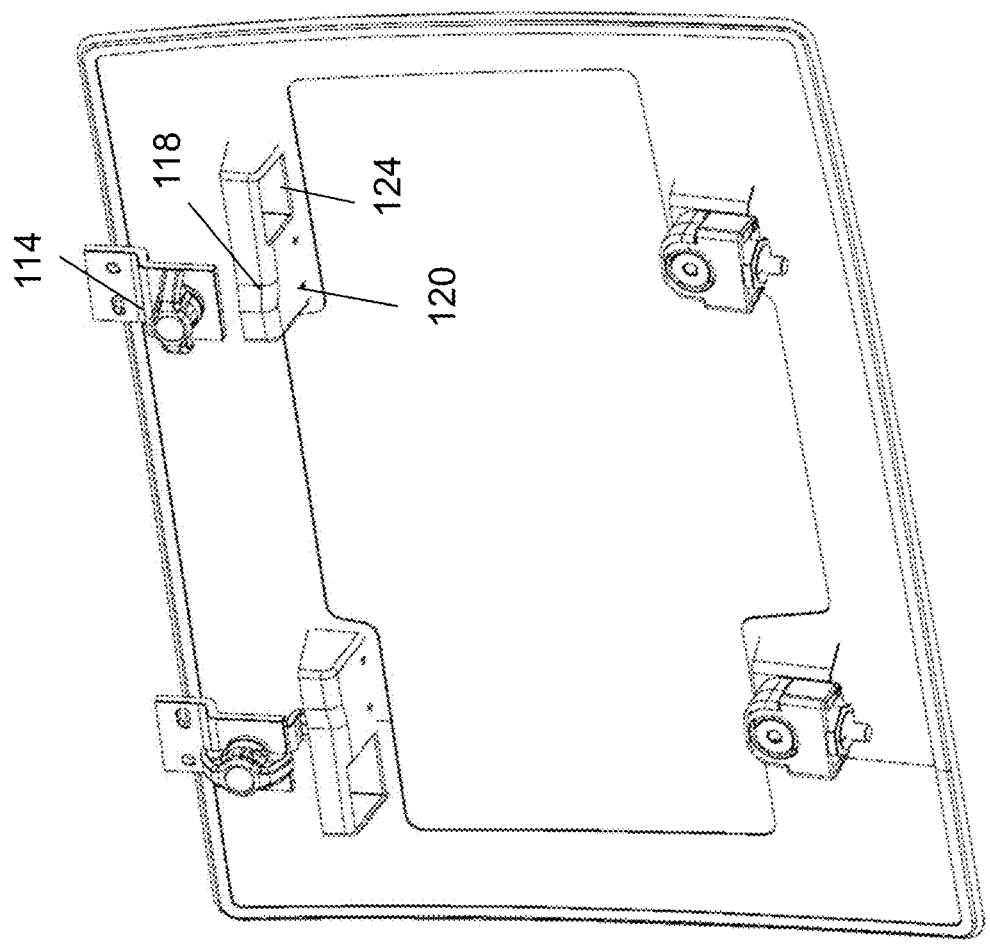
FIG. 12 is an inner lower perspective view of the vehicular glass window assembly of FIG. 11.
Figure 13:
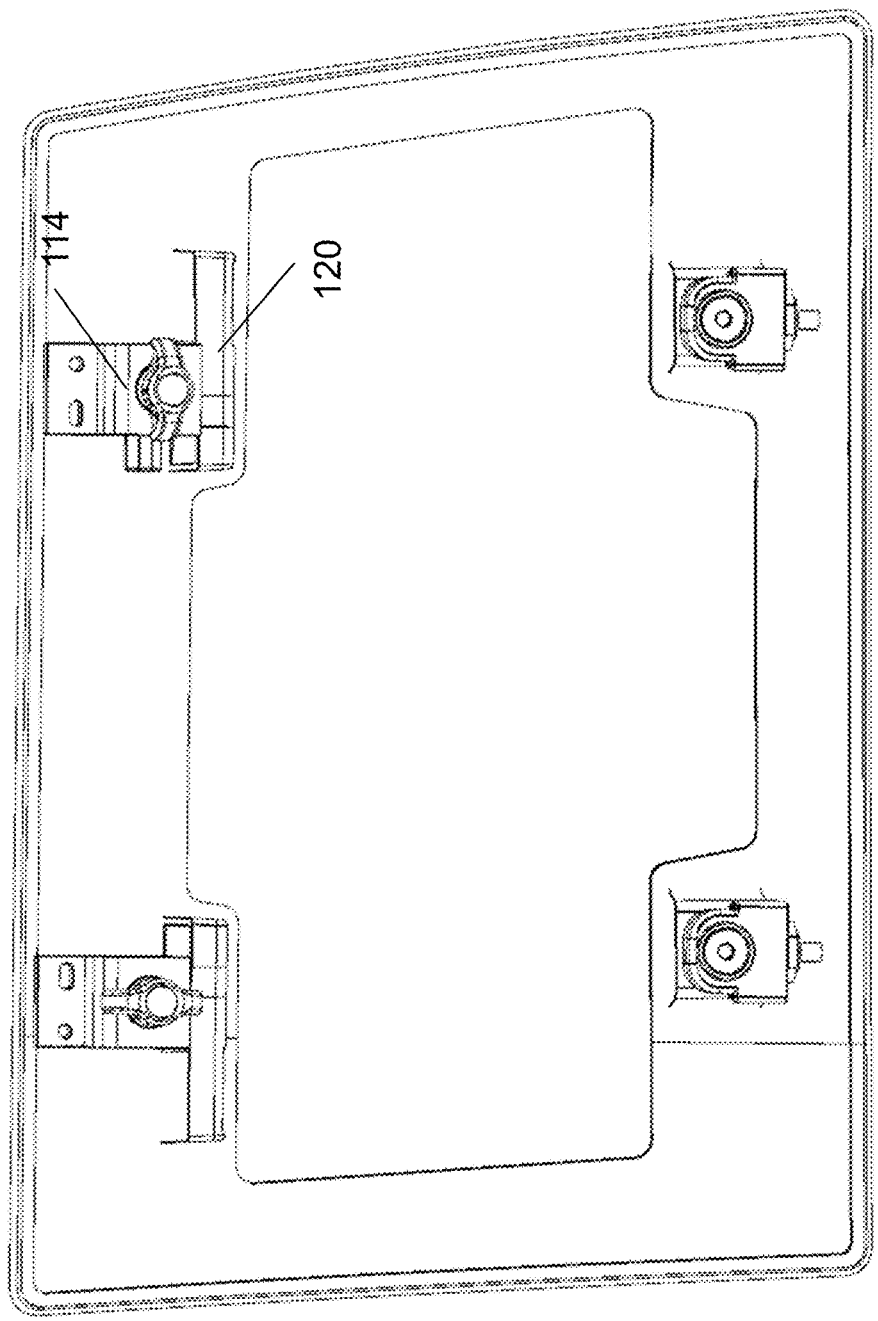
FIG. 13 is an inner plan view of the vehicular glass window assembly of FIG. 11.
Figure 15:
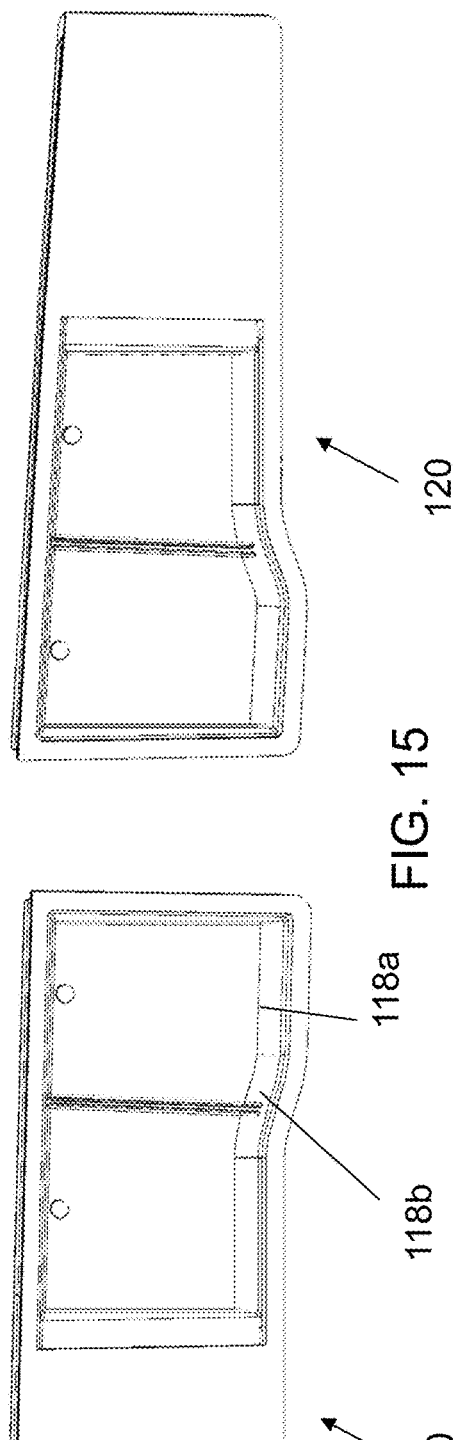
FIG. 15 is a top view of the individual catch and handle portions of FIG. 14.
Figure 16:
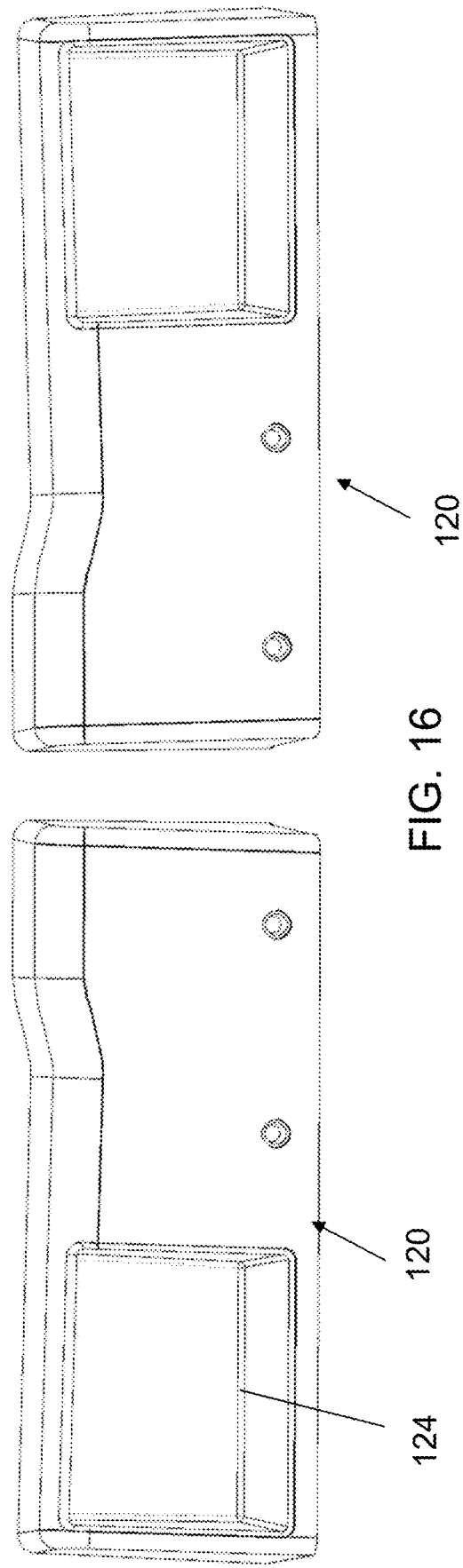
FIG. 16 is a bottom view of the individual catch and handle portions of FIG. 14.
Figure 19:
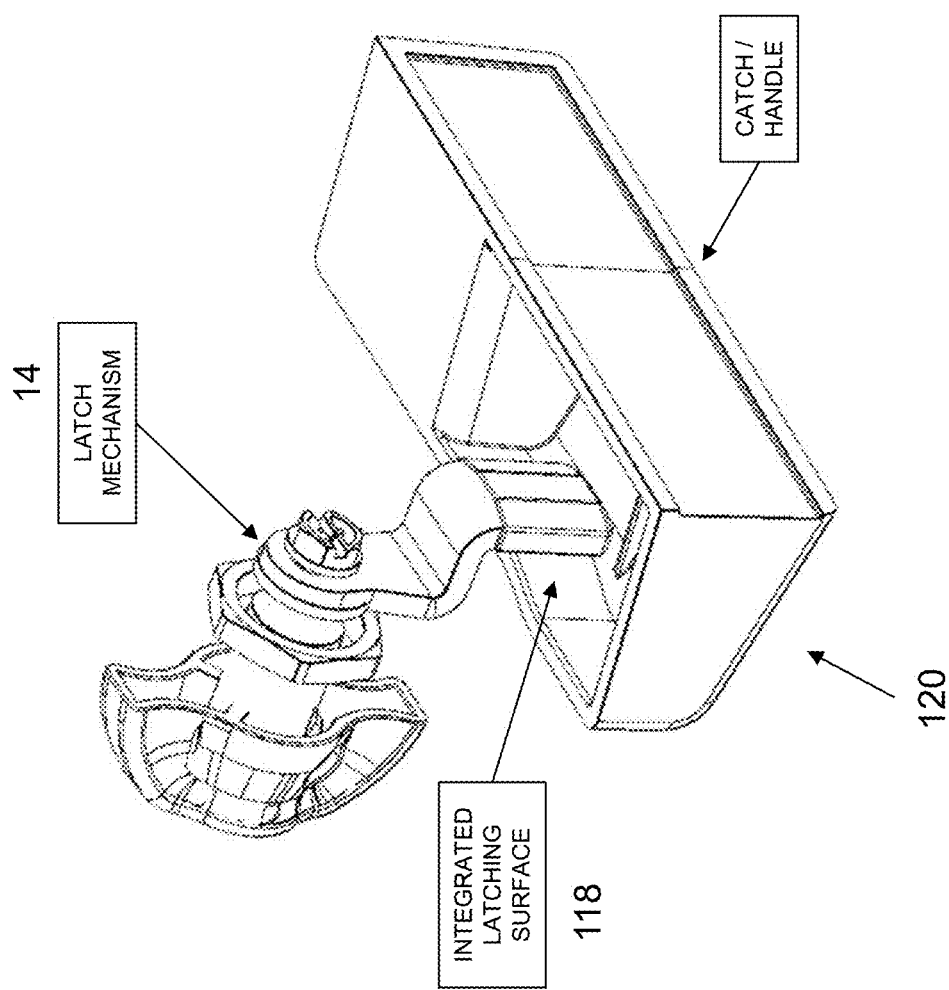
FIG. 19 is a perspective view of an individual catch and handle portion and respective latch mechanism.

The integrated handle and catch structure 20 thus extends between the two latches and provides a pair of latch catches 18 and a handle 24 for carrying the window and for pivoting the window panel into place when attaching the window panel to the vehicle. During installation of the window panel at the vehicle, the lower pins 22 are received at the receivers of the vehicle and then the window is pivoted to its closed position and the latches 18 latch the window panel in place. The latches 18 include manually pivotable latching elements that rotate to move the latching arm or element between the latching or engaged position (see FIGS. 9 and 10) and the unlatched or disengaged or releasing position. When the latches 18 are released, the user can pivot the window panel outward and grasp the handle portion 24 and remove the window assembly from the vehicle and carry the window panel to a storage location. The integrated handle and catch structure 20 thus provides both a handle 24 and the catches 18 via a unitary plastic molding that is bonded to the inner side of the window panel. Although shown and described as having the catches or catch portions integrated with the handle, the window assembly optionally may have latch portions or latching elements disposed at the ends of the structure and integrated with the handle portion, whereby the latching portions are adjustable or movable to engage catches or catch portions at the interior portion of the vehicle when the window assembly is positioned at the vehicle opening.

Optionally, and such as shown in FIGS. 11-19, the handle and catch may include separate spaced apart individual latch and catch portions 120. That is, the window panel assembly may include a plurality of handle and catch structures 120 where the handle and catch structures are respectively disposed along the upper edge region of the window panel and spaced from one another. In the illustrated example, the window assembly includes two handle and catch portions 120 disposed along the upper edge region of the window panel and at opposite end portions of the window panel (e.g., at opposing upper corner regions of the window panel). The handle and catch portions or elements 120 are each formed with a handle or pocket portion 124 and a catch or catch portion 118. Each handle and catch structure 120 includes a respective catch 118 configured to receive and engage a corresponding latch 14 at the vehicle. The catch 118 is formed as an inner flat section or surface 118a at the structure with an inward ramped surface 118b so that, when the latch 14 is pivoted to latch the window assembly at the vehicle, the latching element 14 engages the ramped surface 118b to draw the window panel tight against the vehicle and then the latching element engages the flat surface 118a of the catch 118 to preclude outward movement of the window panel relative to the vehicle.

The handle portion 124 provides a grasping portion of the respective element to assist the user in pivoting the window panel to the closed position, whereby the user can hold the handle portion with one hand while pivoting the latching element to the engaged orientation with the other hand. The handle portion 124 is formed as a rounded recess to accommodate a user's finger or fingers so that a user can readily grasp the handle portion and pivot the window panel or to carry the window assembly when the window assembly is detached from the vehicle.

Figure 24:
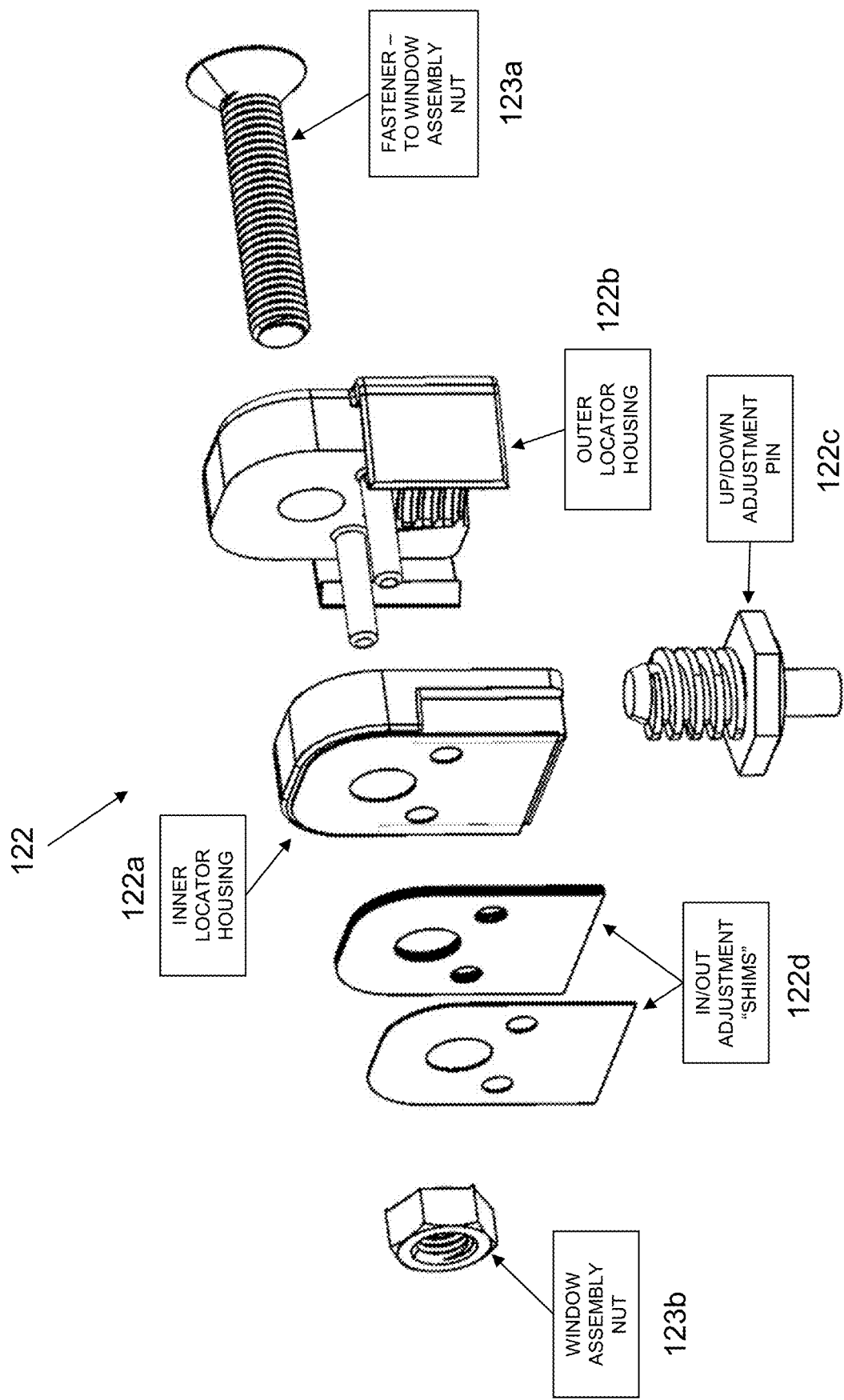
FIG. 24 is an exploded perspective view of the adjustable locator of FIGS. 20-23.
Figure 29:
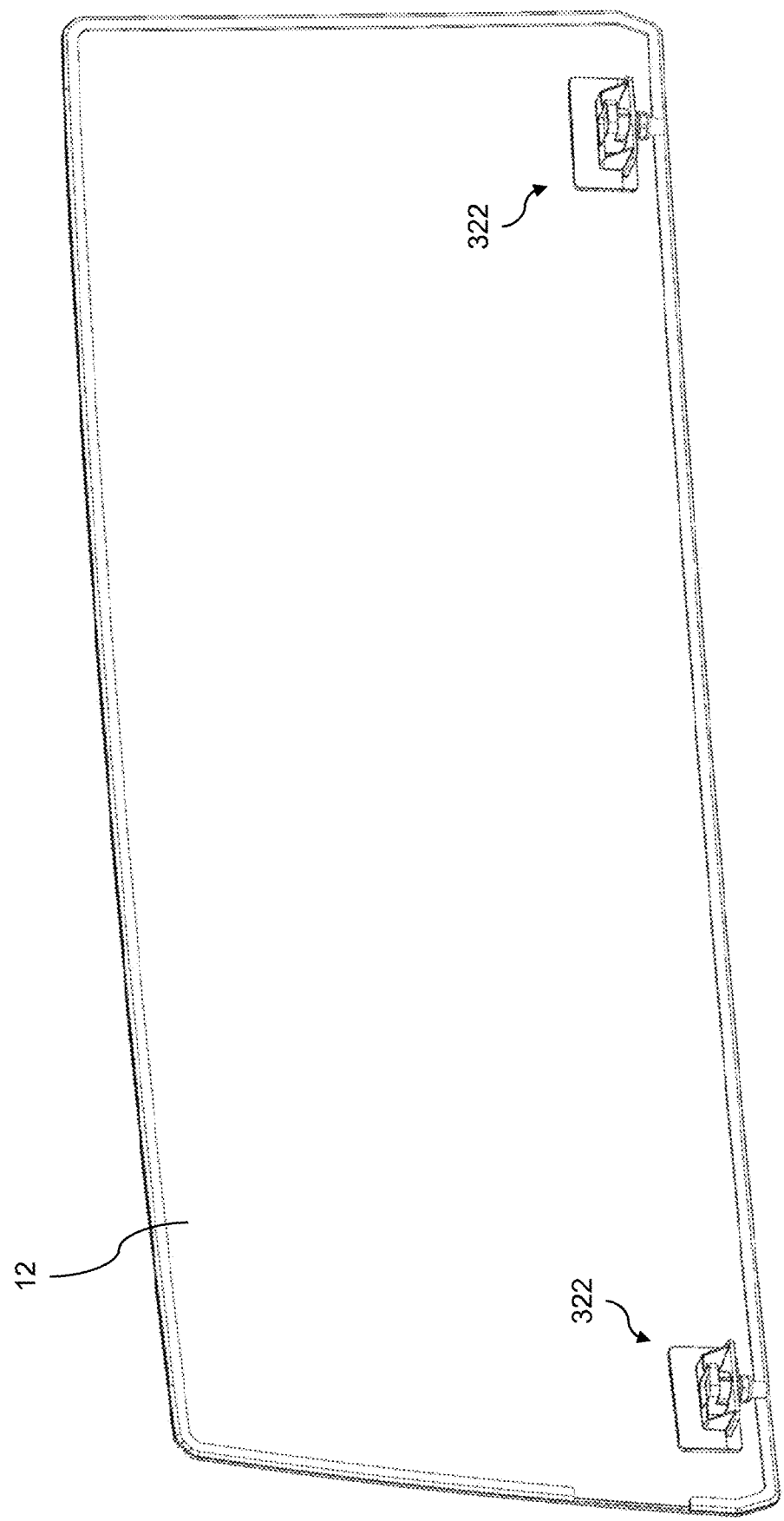
FIG. 29 is a perspective view of another adjustable locator disposed at a glass window panel of a vehicular glass window assembly.
Figure 30:
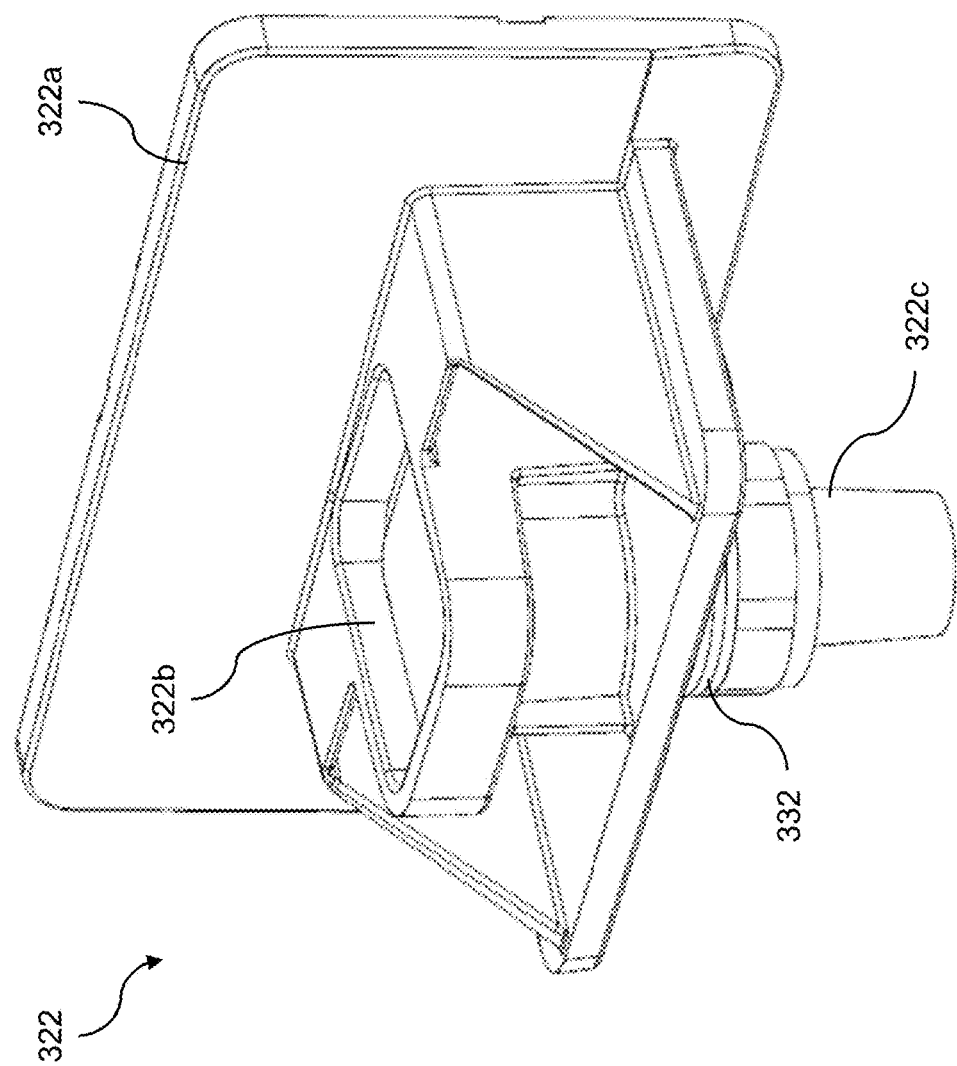
FIGS. 30-33 are views of the adjustable locator of FIG. 29.
Figure 31:
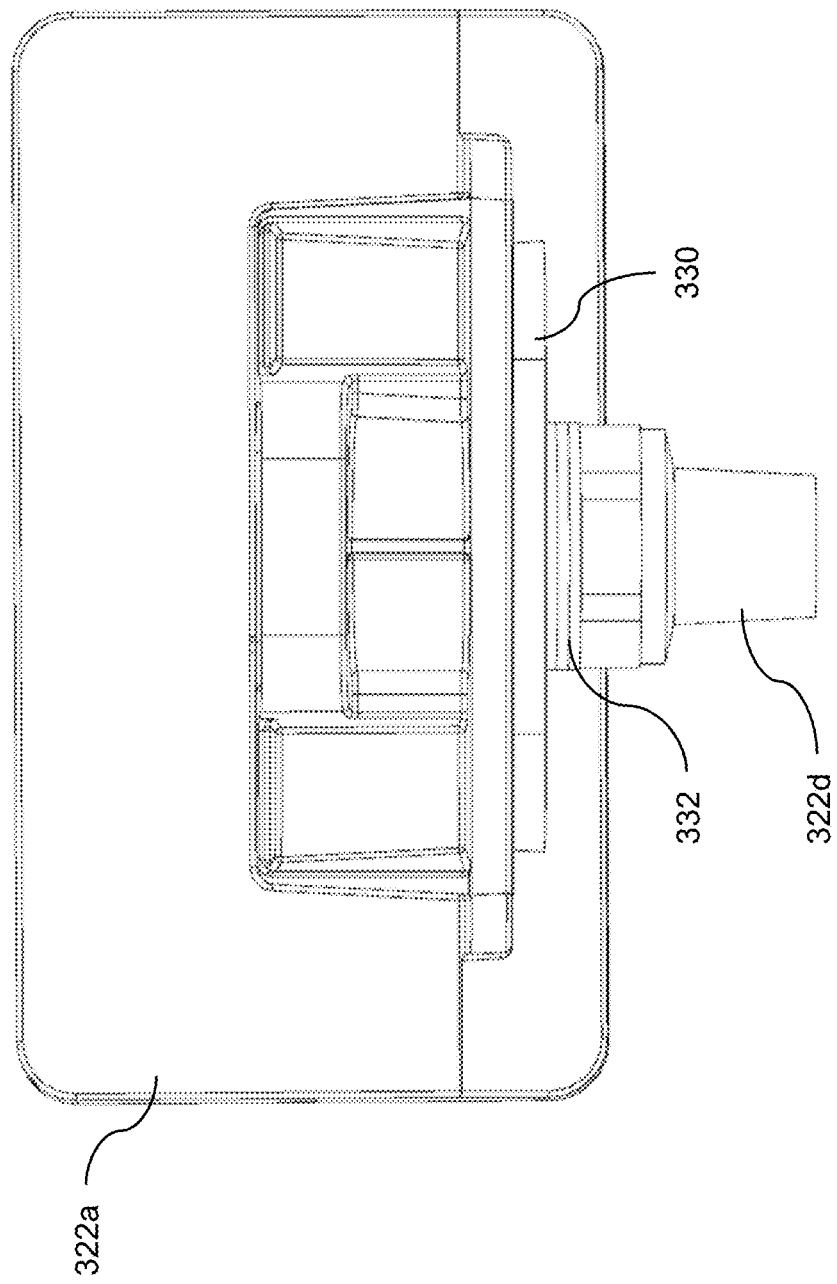

Optionally, the locator pins may comprise adjustable locator pin assemblies or locators 122 (FIGS. 20-24) that are attached at the glass panel and are adjustable to accommodate mounting tolerances and misalignments when mounting or attaching the window assembly at the vehicle. For example, and such as shown in FIG. 24, the locator pin assembly 122 may include a housing having housing portions 122a, 122b that adjustably receive an adjustable pin 122c to allow for vertical adjustment of the pin relative to the housing and the window panel. The locator pin assembly 122 also includes adjustment shims 122d that are added or removed to laterally adjust the housing relative to the window panel. The pin assembly 122 is attached at the window panel via a fastener 123a that threadedly attaches to a window assembly nut 123b. An appropriate or selected spacing (provided by the thickness of one of more shims 122d) is provided by the shims 122d between the housing and the window panel to position the pin relative to the window panel.

That is, the locator 122 includes a housing that attaches to the window panel via a threaded fastener 123a that extends laterally through the housing and through the window panel and is received by or threaded into a nut 123b at an opposite side of the window panel from the housing. The locator housing receives the pin 122c that is axially adjustable relative to the housing, such as via threaded engagement between the pin 122c and the housing. With the housing attached at the window panel, the pin 122c is axially adjustable relative to the housing to adjust a vertical position (i.e., a position along a plane of the window panel) of the window assembly relative to the vehicle when the pin 122c is received at the receiving elements of the vehicle. One or more shims 122d are positioned between the housing and the surface of the window panel to laterally adjust the position of the housing and pin 122c relative to the window panel and thus adjust a horizontal position (i.e., a position perpendicular to the plane of the window panel) of the window assembly relative to the vehicle when the pin 122c is received at the receiving elements of the vehicle.

Optionally, and such as shown in FIGS. 25A, 25B, and 26A-F, the adjustable pin 122c includes a threaded pin that is threadedly and adjustably received in a threaded passageway of the housing (defined by partial threaded housing portions 122a, 122b). The threaded pin 122c includes a threaded portion that is adjustably received along the housing, a locating post or pin portion that extends from the threaded portion to be received at a receiving element of the vehicle, and a seat or base portion between the threaded portion and the post to engage an upper or outer surface of the receiving element. Optionally, and such as shown in FIGS. 27A, 27B, and 28A-F, the adjustable pin 222c includes a keyed pin that is adjustably received in a keyed passageway of the housing (defined by keyed housing portions 222a, 222b). The keyed pin 222c includes a keyed portion that is adjustably received along the housing, a locating post or pin portion that extends from the keyed portion to be received at a receiving element of the vehicle, and a seat or base portion between the keyed portion and the post to engage an upper or outer surface of the receiving element. The pins 122c, 222c are vertically adjustable relative to the housing by rotating the pins to adjust a degree of extension of the pin from the housing.

As shown in FIGS. 26A-F, the outer housing portion 122b includes positioning pins and the inner housing portion 122a includes corresponding receivers to align the housing portions 122a, 122b during assembly of the pin assembly. Further, the outer housing portion 122b includes flexible tabs that snap attach at receiving portions of the inner housing portion 122a to secure the housing portions 122a, 122b together when assembled. The adjustable locator pin assemblies acts as the positioning locator pins for the bottom of the window assembly, and can be adjustable in both the up/down and in/out directions. The adjustable pin feature may be implemented on side windows or rear windows or backlites, depending on the particular window assembly and application.

Referring to FIGS. 29-36, an adjustable locator pin assembly 322 may include a housing portion 322a that adhesively attaches at the inner surface of the window panel and that includes a slot-shaped channel or passageway 322b configured to accommodate the locator pin 322c. As described further below, the locator pin 322c extends axially along the passageway 322b and away from the housing portion 322a to be received by the receiving element at the vehicle, and the locator pin 322c is laterally adjustable within the passageway 322b to adjust the position of the locator pin 322c relative to the window panel, and thus to adjust the position of the window panel relative to the receiving element at the vehicle.

Figure 34:
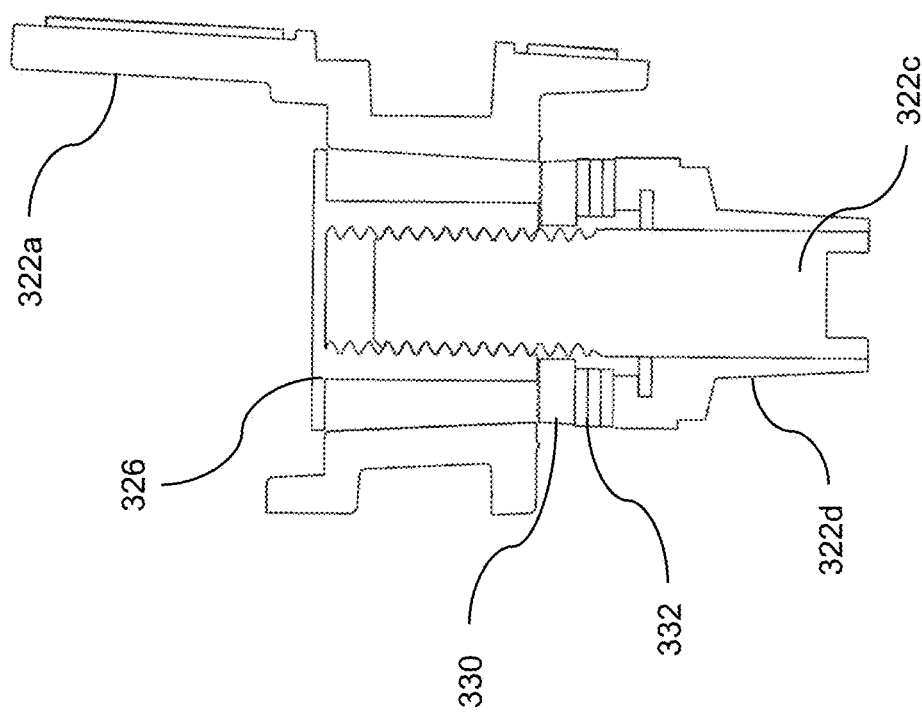
FIG. 34 is a sectional view of the adjustable locator of FIG. 29.
Figure 35:
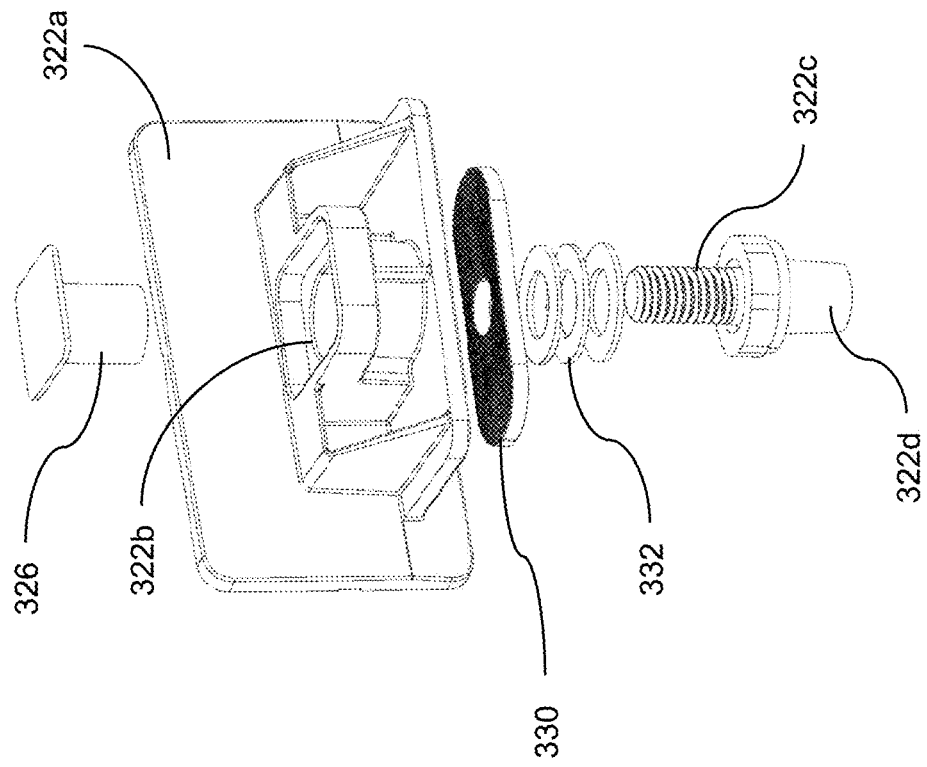
FIG. 35 is an exploded view of the adjustable locator of FIG. 29.

The locator pin 322c includes a threaded portion that is threadably received by a T-nut 326 or other suitable fastener element within the passageway 322b and/or at an opposite side of the housing portion 322a, where the locator pin 322c and T-nut 326 are laterally adjustable within the passageway 322b and may be fastened or tightened together to set the position of the locator pin 322c within the passageway 322b (FIGS. 34 and 35).

A tapered cap 322d may be disposed at an end of the locator pin 322c opposite the threaded portion, such as snap attached or press fit along the locator pin 322c, with the cap 322d configured to be received at the receiving element of the vehicle. The cap 322d may be tapered to assist in locating the pin at the receiving element and for pivoting the window assembly relative to the receiving element.

Figure 32:
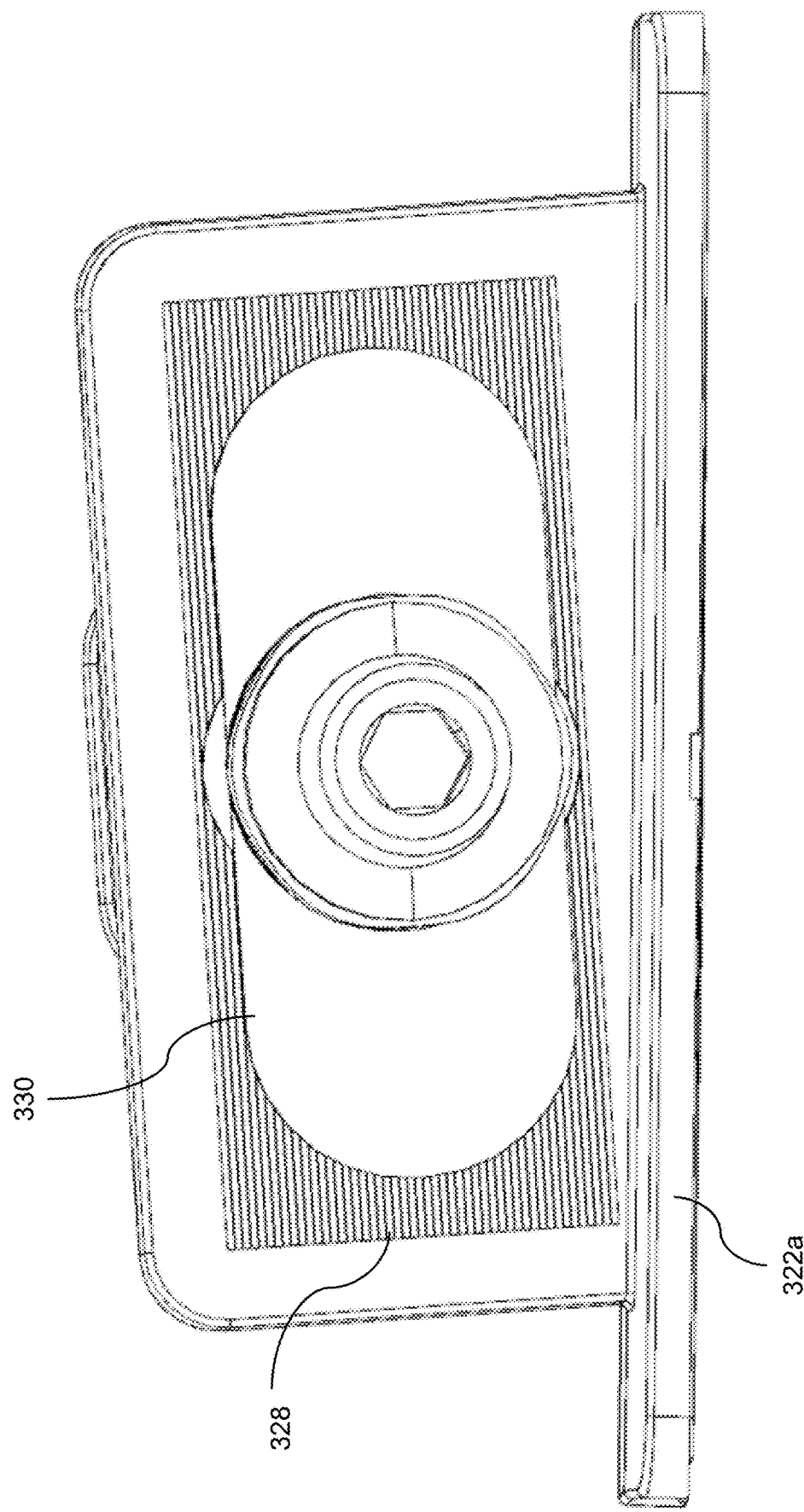
Figure 33:
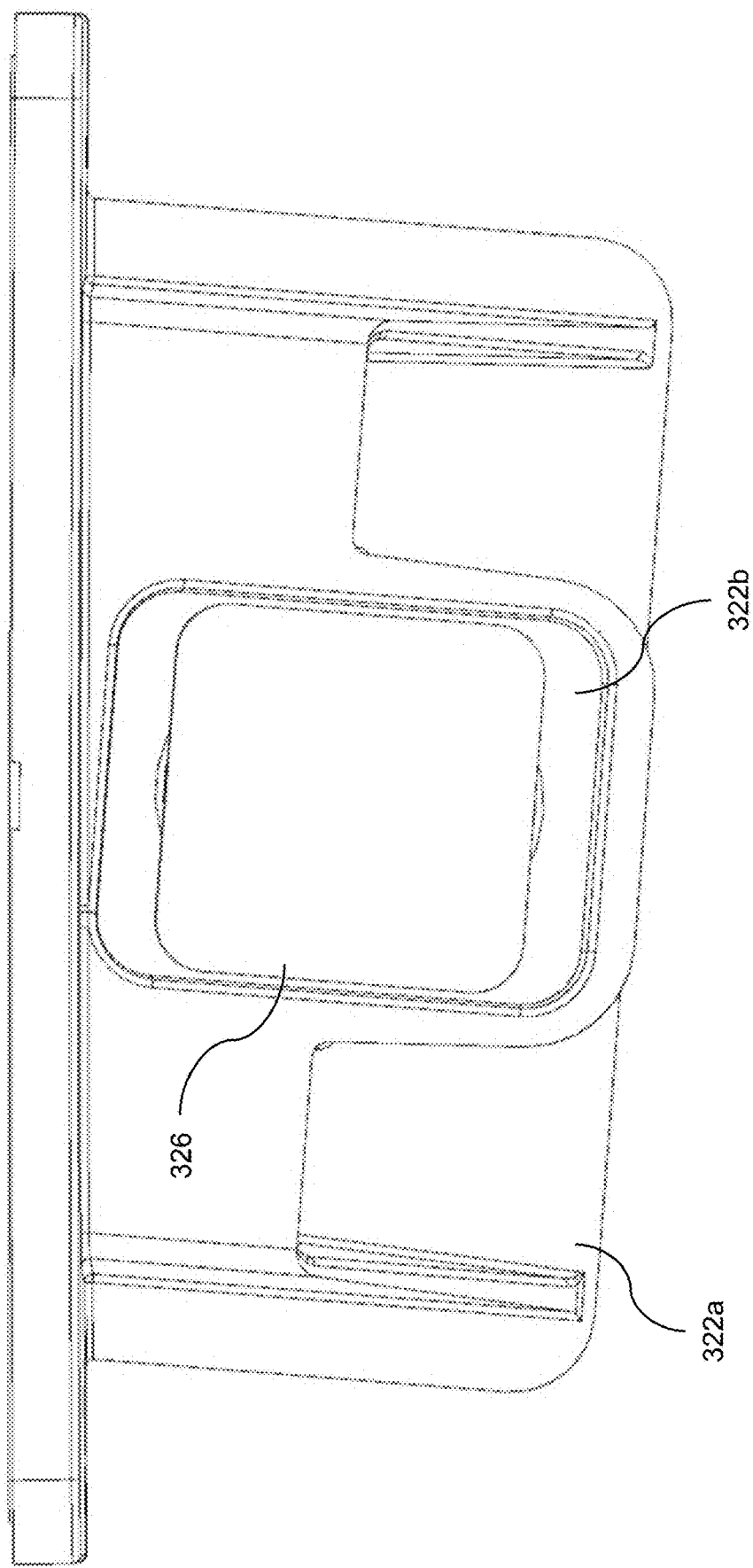
Figure 36:
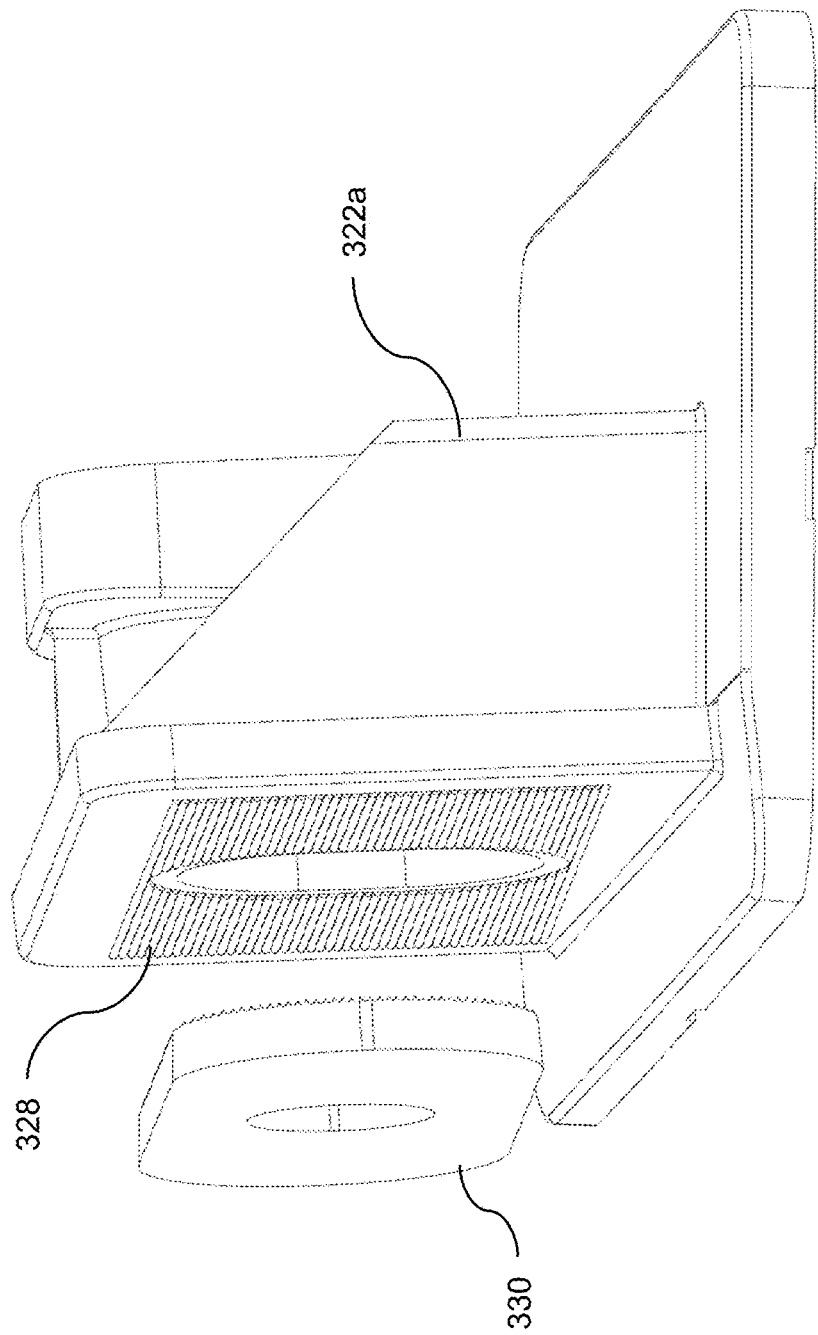
FIG. 36 is an exploded view of a housing and a washer having a sawtooth surface of the adjustable locator of FIG. 29.

As shown in FIGS. 32 and 36, a lower surface of the housing portion 322a facing the tapered cap 322d may include a ridged surface portion or sawtooth surface portion 328 having a series of linear and parallel ridges or protrusions. A washer or spacer 330 having a corresponding ridged surface or sawtooth surface may be disposed between the cap 322d and the housing sawtooth surface portion 328. When the locator pin is moved laterally within the passageway 322b, the sawtooth surfaces move along one another. When the locator pin is tightened to the T-nut 326, the sawtooth surfaces engage one another and are urged toward one another, with the corresponding ridges or protrusions forming a detent interface that precludes lateral movement of the pin relative to the housing portion 322a.

One or more washers or spacers or shims 332 may be disposed along the locator pin 322c between the cap 322d and the T-nut 326 to adjust the axial position of the pin relative to the housing portion 322a and the window panel. Thus, the vertical position of the window panel relative to the vehicle may be adjusted via the addition or subtraction of one or more shims 332 between the cap 322d and the T-nut 326 and/or sawtooth washer 330.

Thus, a selected or desired or appropriate number of shims 332 are placed at the locator pin 322c, and the locator pin is inserted through the washer 330 and through the housing 322a. The T-nut is threaded onto the end of the pin and the pin and T-nut are moved laterally within the housing to position the end of the pin at the appropriate distance from the window panel, whereby the T-nut is tightened onto the pin to urge the washer 330 into engagement with the sawtooth surface portion of the housing and thus to secure the pin at the housing and window panel.

Figure 2:
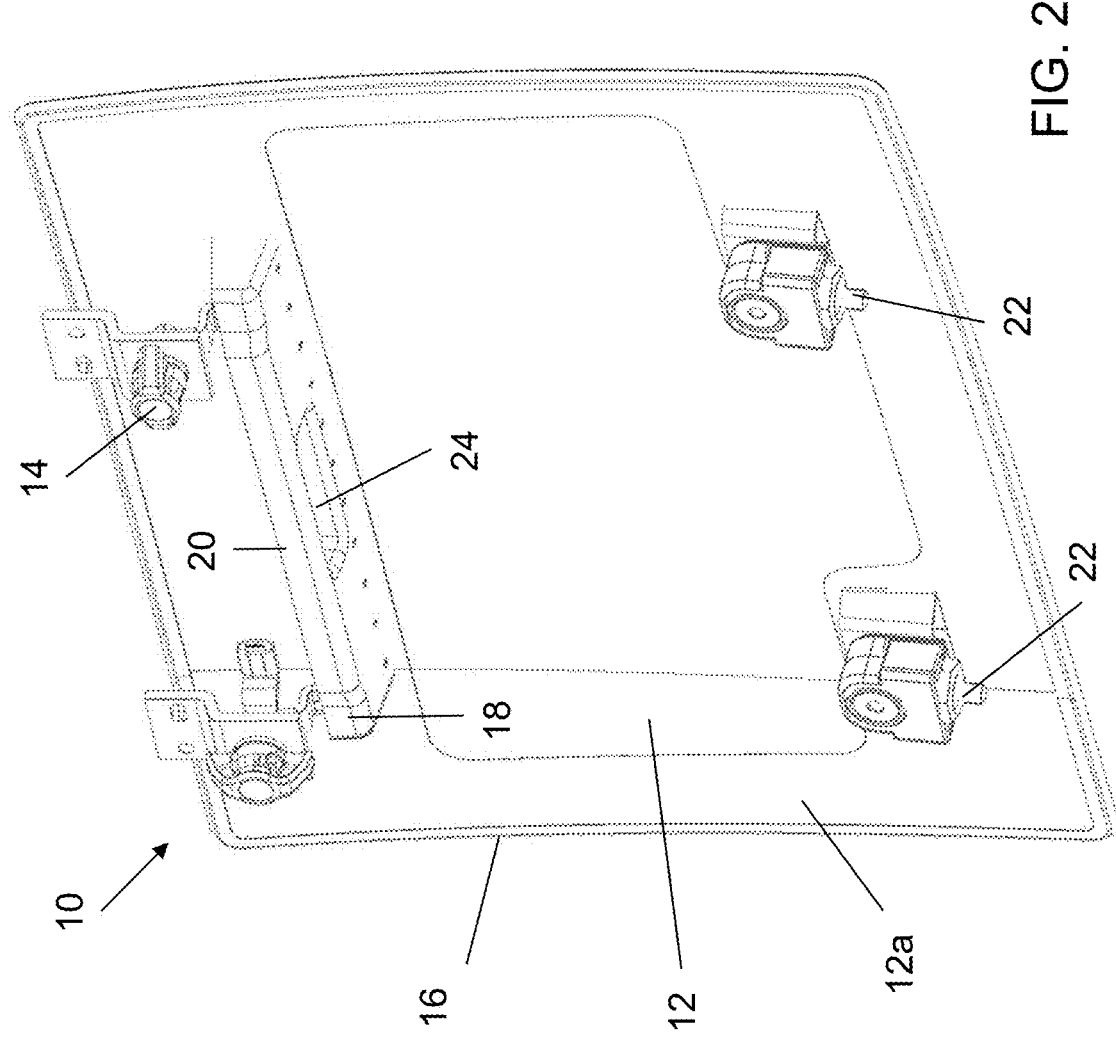
FIG. 2 is an inner lower perspective view of the vehicular glass window assembly of FIG. 1.
Figure 3:
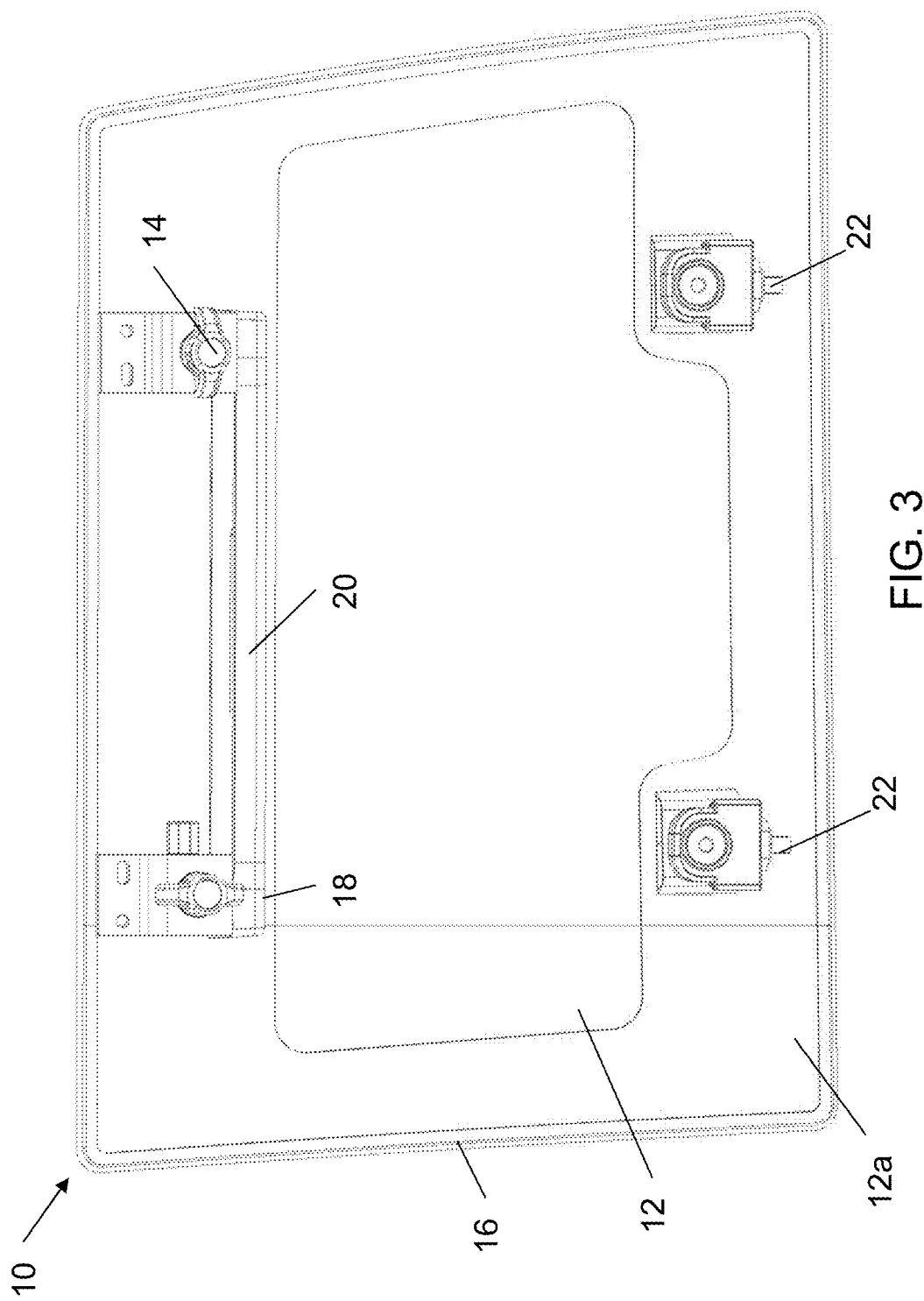
FIG. 3 is an inner plan view of the vehicular glass window assembly of FIG. 1.

The glass window panel comprises a transparent glass panel. The glass panel may comprise any suitable material, such as transparent glass or polycarbonate or the like. Optionally, and desirably, the glass window panel may comprise a thin, strong glass material, such as GORILLA® Glass (commercially available from Corning Incorporated), which provides a lightweight and strong glass panel. Optionally, a ceramic frit layer or darkened layer or light absorbing layer 12a or the like may be disposed at the glass panel 12 at locations where the perimeter seal and catch/handle is attached at, so that the seal and catch/handle are not viewable from exterior of the vehicle by a person viewing the glass panel of the vehicle from exterior of the vehicle (FIGS. 1-3). The catch/handle may be adhesively attached to the inner side of the glass panel by utilizing aspects of the window assemblies described in U.S. Pat. Nos. 5,551,197 and 5,853,895, which are hereby incorporated herein by reference in their entireties. For example, the catch/handle may be bonded to the glass panel using any suitable adhesive, such as a one component urethane adhesive, such as a moisture cured adhesive, such as BETASEAL® or the like. Optionally, the window panel and handle and catch structure may comprise a unitary window panel with the structure and panel formed via a common injection molding process (such as by utilizing aspects of the window panels described in U.S. Pat. No. 8,881,458, which is hereby incorporated herein by reference in its entirety).

The glass panel assembly provides a single glass panel that is removably or detachably attached at the vehicle via a plurality of latches. Optionally, the window panel assembly may utilize aspects of the window assemblies described in U.S. Pat. Nos. 8,915,018; 7,073,293; 7,003,916; 6,691,464; 6,026,611; 5,996,284 and/or 5,799,444, and/or U.S. Publication Nos. 2023-0070479; 2014-0047772; 2008-0127563; 2008-0106124; 2006-0107600; 2004-0020131 and/or 2003-0213179, which are all hereby incorporated herein by reference in their entireties. Optionally, the glass panel may include one or more electrically conductive elements, such as heater grids or the like, which may be powered utilizing aspects of the window assemblies described in U.S. Pat. Nos. 8,881,458 and/or 8,402,695, which are hereby incorporated herein by reference in their entireties. Electrical connection to the heater grids may be made via electrical connection to a vehicle power source at one or both pins or latching elements or other electrical contact between electrically conductive traces or elements at the window panel and corresponding contacts at the vehicle.

Changes and modifications to the specifically described embodiments may be carried out without departing from the principles of the present invention, which is intended to be limited only by the scope of the appended claims, as interpreted according to the principles of patent law.

The invention claimed is:

1. A vehicular glass window panel assembly, the vehicular glass window panel assembly comprising:
    a glass panel having an inner side and an outer side;
    a handle and catch element adhesively bonded along a first perimeter region of the inner side of the glass panel;
    wherein the handle and catch element comprises a handle portion and a catch, and wherein the catch is configured for engaging a latching element of a vehicle equipped with the vehicular glass window panel assembly when the vehicular glass window panel assembly is mounted at the vehicle to close over an aperture of the vehicle;
    wherein the handle and catch element is formed as a single component via a plastic injection molding process;
    wherein, with the latching element of the vehicle engaged with the catch, the vehicular glass window panel assembly is secured at the vehicle;
    wherein, with the latching element of the vehicle disengaged from the catch, the vehicular glass window panel assembly is removable from the vehicle; and
    wherein, with the vehicular glass window panel assembly removed from the vehicle, the handle portion is graspable by a user to carry the vehicular glass window panel assembly; and
    wherein the catch comprises a (i) first catch formed at a first end of the handle and catch element and (ii) a second catch formed at a second end of the handle and catch element, and wherein the first end is opposite the second end.

2. The vehicular glass window panel assembly of claim 1, wherein the handle portion is disposed at a central portion of the handle and catch element between the first catch and the second catch, and wherein the central portion has a cross dimension that is greater than respective cross dimensions of the first catch and the second catch, and wherein respective ramped surfaces are formed between the central portion and the first catch and the second catch.

3. The vehicular glass window panel assembly of claim 1, comprising (i) a first handle and catch element adhesively bonded at a first end region of the first perimeter region of the inner side of the glass panel and (ii) a second handle and catch element adhesively bonded along a second end region of the first perimeter region of the inner side of the glass panel, and wherein the first end region is opposite the second end region.

4. The vehicular glass window panel assembly of claim 1, further comprising a perimeter sealing element disposed along a periphery of the glass panel.

5. The vehicular glass window panel assembly of claim 1, further comprising at least one mounting pin disposed at a second perimeter region of the glass panel opposite the first perimeter region where the handle and catch element is disposed, wherein the at least one mounting pin is configured to be received at a receiving portion of the vehicle to position the vehicular glass window panel assembly at the aperture of the vehicle.

6. The vehicular glass window panel assembly of claim 5, wherein the at least one mounting pin comprises a pair of mounting pins.

7. The vehicular glass window panel assembly of claim 1, wherein the handle and catch element comprises an attaching surface that comprises a recessed portion for receiving adhesive therein to adhesively bond the handle and catch element at the inner side of the glass panel.

8. The vehicular glass window panel assembly of claim 1, wherein, with the vehicular glass window panel assembly mounted at the vehicle, the inner side faces an interior cabin of the vehicle and the outer side faces exterior the vehicle.

9. A vehicular glass window panel assembly, the vehicular glass window panel assembly comprising:
- a glass panel having an inner side and an outer side;
- a handle and catch element adhesively bonded along a first perimeter region of the inner side of the glass panel;
- wherein the handle and catch element comprises a handle portion and a catch, and wherein the catch is configured for engaging a latching element of a vehicle equipped with the vehicular glass window panel assembly when the vehicular glass window panel assembly is mounted at the vehicle to close over an aperture of the vehicle;
- wherein the handle and catch element is formed as a single component via a plastic injection molding process;
- wherein, with the latching element of the vehicle engaged with the catch, the vehicular glass window panel assembly is secured at the vehicle;
- wherein, with the latching element of the vehicle disengaged from the catch, the vehicular glass window panel assembly is removable from the vehicle;
- wherein, with the vehicular glass window panel assembly removed from the vehicle, the handle portion is graspable by a user to carry the vehicular glass window panel assembly;
- at least one mounting pin disposed at a second perimeter region of the glass panel opposite the first perimeter region where the handle and catch element is disposed, wherein the at least one mounting pin is configured to be received at a receiving portion of the vehicle to position the vehicular glass window panel assembly at the aperture of the vehicle; and
- wherein the at least one mounting pin comprises an adjustable pin assembly having a pin that is adjustable relative to the glass panel along a longitudinal axis of the pin.

10. The vehicular glass window panel assembly of claim 9, wherein the adjustable pin assembly is laterally adjustable relative to the glass panel in a direction perpendicular to a longitudinal axis of the pin.

11. A vehicular glass window panel assembly, the vehicular glass window panel assembly comprising:
- a glass panel having an inner side and an outer side, wherein, with the vehicular glass window panel assembly mounted at a vehicle equipped with the vehicular glass window panel assembly, the inner side faces an interior cabin of the vehicle and the outer side faces exterior the vehicle;
- a handle and catch element adhesively bonded along a first perimeter region of the inner side of the glass panel;
- wherein the handle and catch element comprises a handle portion and a catch, and wherein the catch is configured for engaging a latching element of the vehicle when the vehicular glass window panel assembly is mounted at the vehicle so as to close over an aperture of the vehicle;
- a mounting pin disposed at a second perimeter region of the glass panel, wherein the second perimeter region is opposite the first perimeter region;
- wherein the mounting pin is configured to be received at a receiving portion of the vehicle to position the vehicular glass window panel assembly at the aperture of the vehicle;
- wherein the handle and catch element is formed as a single component via a plastic injection molding process;
- wherein, with the mounting pin received at the receiving portion of the vehicle, and with the latching element of the vehicle engaged with the catch, the vehicular glass window panel assembly is secured at the vehicle;
- wherein, with the latching element of the vehicle is disengaged from the catch, and with the mounting pin released by the receiving portion of the vehicle, the vehicular glass window panel assembly is removable from the vehicle; and
- wherein, with the vehicular glass window panel assembly removed from the vehicle, the handle portion is graspable by a user to carry the vehicular glass window panel assembly.

12. The vehicular glass window panel assembly of claim 11, wherein the catch comprises a (i) first catch formed at a first end of the handle and catch element and (ii) a second catch formed at a second end of the handle and catch element, and wherein the first end is opposite the second end.

13. The vehicular glass window panel assembly of claim 12, wherein the handle portion is disposed at a central portion of the handle and catch element between the first catch and the second catch, and wherein the central portion has a cross dimension that is greater than respective cross dimensions of the first catch and the second catch, and wherein respective ramped surfaces are formed between the central portion and the first catch and the second catch.

14. The vehicular glass window panel assembly of claim 11, comprising (I) a first handle and catch element adhesively bonded along a first side region of the inner side of the glass panel and (ii) a second handle and catch element adhesively bonded along a second side region of the inner side of the glass panel, and wherein the first side region is opposite the second side region.

15. The vehicular glass window panel assembly of claim 11, further comprising a perimeter sealing element disposed along a periphery of the glass panel.

16. The vehicular glass window panel assembly of claim 11, wherein the mounting pin comprises a pair of mounting pins.

17. The vehicular glass window panel assembly of claim 11, wherein the mounting pin comprises an adjustable pin assembly having a pin that is adjustable relative to the glass panel along a longitudinal axis of the pin.

18. The vehicular glass window panel assembly of claim 17, wherein the adjustable pin assembly is laterally adjustable relative to the glass panel in a direction perpendicular to a longitudinal axis of the pin.

19. The vehicular glass window panel assembly of claim 11, wherein the handle and catch element comprises an attaching surface that comprises a recessed portion for receiving adhesive therein to adhesively bond the handle and catch element at the inner side of the glass panel.

\* \* \* \* \*

UNITED STATES PATENT AND TRADEMARK OFFICE
CERTIFICATE OF CORRECTION

PATENT NO. : 12,304,286 B2
APPLICATION NO. : 18/477812
DATED : May 20, 2025
INVENTOR(S) : Kyle S. Bowman Page 1 of 1

It is certified that error appears in the above-identified patent and that said Letters Patent is hereby corrected as shown below:

In the Claims

Column 8
Claim 1, Line 50, "vehicle; and" should be --vehicle;--

Column 9
Claim 3, Line 4, "(il) a second handle" should be --(ii) a second handle--

Column 10
Claim 12, Line 49, "(il) a second" should be --(ii) a second--
Claim 14, Line 62, "(l) a first handle" should be --(i) a first handle--

Signed and Sealed this
Seventeenth Day of June, 2025

Coke Morgan Stewart
*Acting Director of the United States Patent and Trademark Office*